US012638668B2

(12) United States Patent (10) Patent No.: US 12,638,668 B2
Wen et al. (45) Date of Patent: May 26, 2026

(54) METHOD AND ASTROPHOTOGRAPHIC APPARATUS FOR ACQUIRING IMAGES OF TARGETS IN SKY AREA

(71) Applicant: SUZHOU ZHEN WANG OPTICAL CO., LTD, Suzhou (CN)

(72) Inventors: Jia Wen, Suzhou (CN); Mouling Song, Suzhou (CN); Di Meng, Suzhou (CN)

(73) Assignee: SUZHOU ZHEN WANG OPTICAL CO., LTD, Suzhou (CN)

( * ) Notice: Subject to any disclaimer, the term of this patent is extended or adjusted under 35 U.S.C. 154(b) by 585 days.

(21) Appl. No.: 18/172,497

(22) Filed: Feb. 22, 2023

(65) Prior Publication Data

US 2023/0209169 A1     Jun. 29, 2023

Related U.S. Application Data

(63) Continuation of application No. PCT/CN2021/112740, filed on Aug. 16, 2021.

(30) Foreign Application Priority Data

Aug. 31, 2020     (CN) .......................... 202010892311.9

(51) Int. Cl.
    *G02B 23/16*         (2006.01)
    *G01S 3/786*         (2006.01)
    (Continued)

(52) U.S. Cl.
    CPC .......... *G02B 23/165* (2013.01); *G01S 3/7867* (2013.01); *G06T 7/33* (2017.01);
    (Continued)

(58) Field of Classification Search
    CPC ....... G02B 23/165; G01S 3/7867; G06T 7/33; G06T 7/73; G06T 5/70; G06V 20/10;
    (Continued)

(56) References Cited

U.S. PATENT DOCUMENTS 5,537,250 A * 7/1996 Masunaga .............. G02B 23/00
                                                              359/399
6,269,580 B1 * 8/2001 Suzuki ................... G02B 23/14
                                                              359/422
(Continued)

*Primary Examiner* — Kathleen Y Dulaney
(74) *Attorney, Agent, or Firm* — Westbridge IP LLC

(57) ABSTRACT

Disclosed are a method and an astrophotographic apparatus for acquiring images of targets in a sky area. The method includes: step 1, an image acquisition device is driven through a controlled rotatable component to point to the position near a target in a sky area, and images of the sky area are acquired through the image acquisition device; step 2, the images of the sky area are analyzed to obtain the right ascension coordinates and the declination coordinates of the center point of images for synchronizing the coordinates to the controlled rotatable component; step 3, the image acquisition device is driven by the controlled rotatable component to point to a target position of the target right ascension coordinates and the target declination coordinates corresponding to the target celestial body to acquire the images; and step 4, an image processing is performed on the images to obtain the processed images.

8 Claims, 15 Drawing Sheets

Step 1, driving an image acquisition device through a controlled rotatable component to point to the position near a target in the sky area, and acquiring images of the sky area through the image acquisition device according to target right ascension coordinates and target declination coordinates corresponding to a target celestial body received step 2, analyzing the images of the sky area to obtain right ascension coordinates and declination coordinates of the center point of images for synchronizing the right ascension coordinates and the declination coordinates to the controlled rotatable component, and determining the pointing of the image acquisition device as the positions of the right ascension coordinates and the declination coordinates step 3, driving the image acquisition device by the controlled rotatable component to point to a target position of the target right ascension coordinates and the target declination coordinates corresponding to the target celestial body for the image acquisition device to acquire the images of the target in the sky area according to the target right ascension coordinates and the target declination coordinates corresponding to the target celestial body, as well as the right ascension coordinates and the declination coordinates currently pointed by the image acquisition device step 4, performing an image processing on the images of the target in the sky area to obtain the processed images of the target in the sky area

(51) Int. Cl.
| | |
|---|---|
| *G06T 7/33* | (2017.01) |
| *G06T 7/73* | (2017.01) |
| *G06V 20/10* | (2022.01) |
| *H04N 23/695* | (2023.01) |

(52) U.S. Cl.
CPC .............. *G06T 7/73* (2017.01); *G06V 20/10* (2022.01); *H04N 23/695* (2023.01)

(58) Field of Classification Search
CPC ...... G06V 10/16; H04N 23/695; H04N 23/81; H04N 19/42; H04N 23/80; G01C 1/04
USPC .................. 382/103; 359/399, 430; 356/140
See application file for complete search history.

(56) References Cited

U.S. PATENT DOCUMENTS

| | | | | | |
|---|---|---|---|---|---|
| 7,301,698 | B2 * | 11/2007 | Chen | ...................... | G02B 23/16 |
| | | | | | 359/399 |
| 7,482,564 | B2 * | 1/2009 | Baun | ...................... | G02B 23/12 |
| | | | | | 250/203.1 |
| 10,509,213 | B1 * | 12/2019 | Monari | ................ | G02B 15/163 |
| 10,740,609 | B1 * | 8/2020 | Shaddix | ................. | G06F 18/23 |
| 11,181,606 | B1 * | 11/2021 | Rowe | ................... | G02B 23/105 |
| 2004/0231660 | A1 * | 11/2004 | Nakamura | .............. | F24S 23/70 |
| | | | | | 126/600 |
| 2006/0158722 | A1 * | 7/2006 | Fujimoto | ............... | G02B 23/00 |
| | | | | | 359/399 |
| 2007/0183031 | A1 * | 8/2007 | Xu | .......................... | G02B 23/02 |
| | | | | | 700/63 |
| 2008/0118154 | A1 * | 5/2008 | Kurth | ..................... | G06V 20/13 |
| | | | | | 382/190 |
| 2010/0277795 | A1 * | 11/2010 | Lopresti | ............... | G02B 23/165 |
| | | | | | 359/429 |
| 2011/0285855 | A1 * | 11/2011 | Ota | .......................... | G01S 3/782 |
| | | | | | 348/169 |
| 2011/0293139 | A1 * | 12/2011 | Ohta | ..................... | G01S 3/7867 |
| | | | | | 382/103 |
| 2014/0111853 | A1 * | 4/2014 | Xu | ......................... | G02B 23/165 |
| | | | | | 359/430 |
| 2015/0177508 | A1 * | 6/2015 | Laabs | ...................... | G01C 1/02 |
| | | | | | 356/140 |
| 2018/0172796 | A1 * | 6/2018 | Kechler | ................. | G01S 3/7867 |
| 2018/0210062 | A1 * | 7/2018 | Qiu | ....................... | G02B 23/165 |
| 2018/0220047 | A1 * | 8/2018 | Baudat | ................... | H04N 23/81 |
| 2019/0297238 | A1 * | 9/2019 | Klosterman | ............. | G06T 7/37 |
| 2020/0233055 | A1 * | 7/2020 | Xu | ......................... | G01C 25/00 |
| 2021/0278687 | A1 * | 9/2021 | Tsuchiya | ................ | G02B 23/12 |
| 2021/0289142 | A1 * | 9/2021 | Terauchi | ................ | H04N 23/61 |
| 2022/0050868 | A1 * | 2/2022 | Chen | ..................... | G06F 16/587 |
| 2022/0201211 | A1 * | 6/2022 | Tsuchiya | ............ | H04N 23/6812 |
| 2023/0345133 | A1 * | 10/2023 | Qiu | ......................... | H04N 23/60 |

* cited by examiner

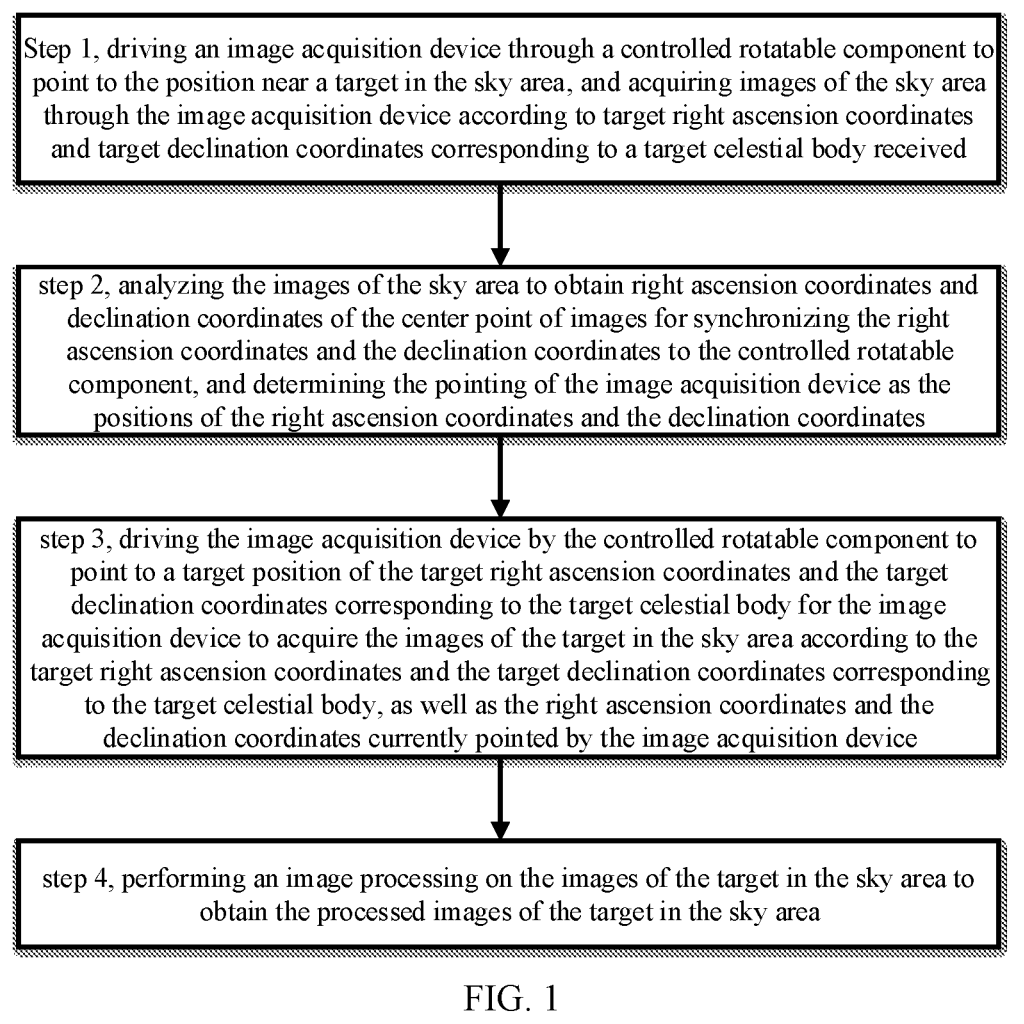

Step 1, driving an image acquisition device through a controlled rotatable component to point to the position near a target in the sky area, and acquiring images of the sky area through the image acquisition device according to target right ascension coordinates and target declination coordinates corresponding to a target celestial body received step 2, analyzing the images of the sky area to obtain right ascension coordinates and declination coordinates of the center point of images for synchronizing the right ascension coordinates and the declination coordinates to the controlled rotatable component, and determining the pointing of the image acquisition device as the positions of the right ascension coordinates and the declination coordinates step 3, driving the image acquisition device by the controlled rotatable component to point to a target position of the target right ascension coordinates and the target declination coordinates corresponding to the target celestial body for the image acquisition device to acquire the images of the target in the sky area according to the target right ascension coordinates and the target declination coordinates corresponding to the target celestial body, as well as the right ascension coordinates and the declination coordinates currently pointed by the image acquisition device step 4, performing an image processing on the images of the target in the sky area to obtain the processed images of the target in the sky area

FIG. 1

First image

Celestial pole

Polar axis

2

1

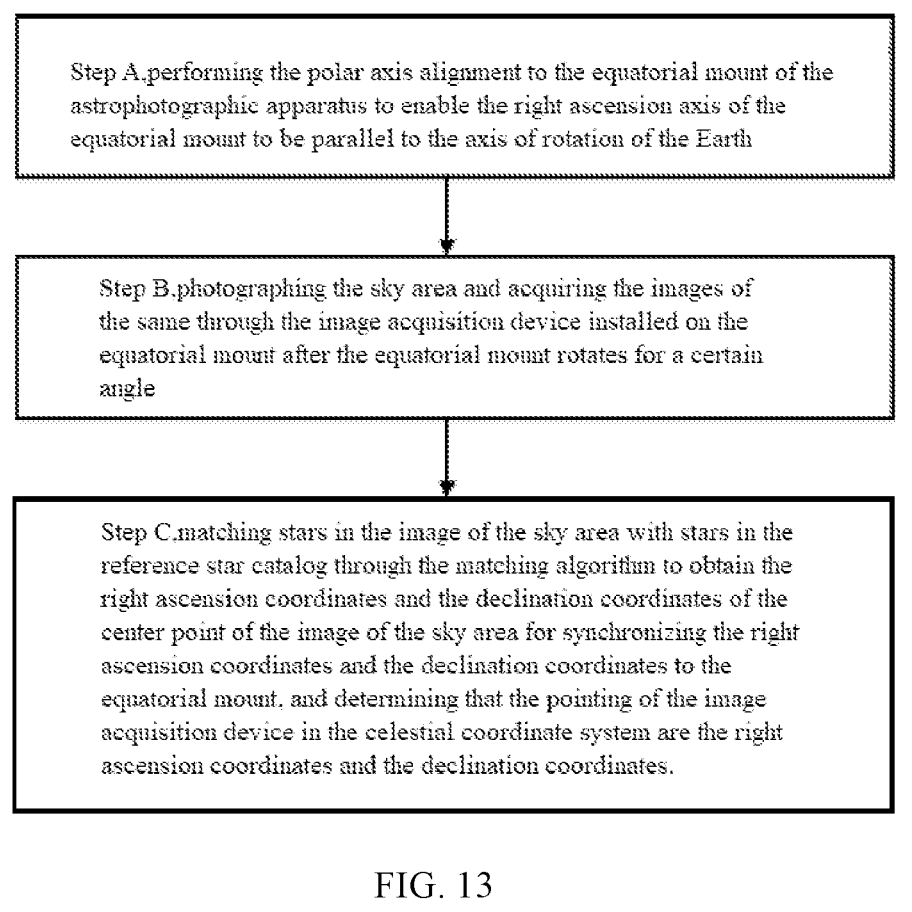

Step A.performing the polar axis alignment to the equatorial mount of the astrophotographic apparatus to enable the right ascension axis of the equatorial mount to be parallel to the axis of rotation of the Earth Step B.photographing the sky area and acquiring the images of the same through the image acquisition device installed on the equatorial mount after the equatorial mount rotates for a certain angle Step C.matching stars in the image of the sky area with stars in the reference star catalog through the matching algorithm to obtain the right ascension coordinates and the declination coordinates of the center point of the image of the sky area for synchronizing the right ascension coordinates and the declination coordinates to the equatorial mount. and determining that the pointing of the image acquisition device in the celestial coordinate system are the right ascension coordinates and the declination coordinates.

FIG. 13

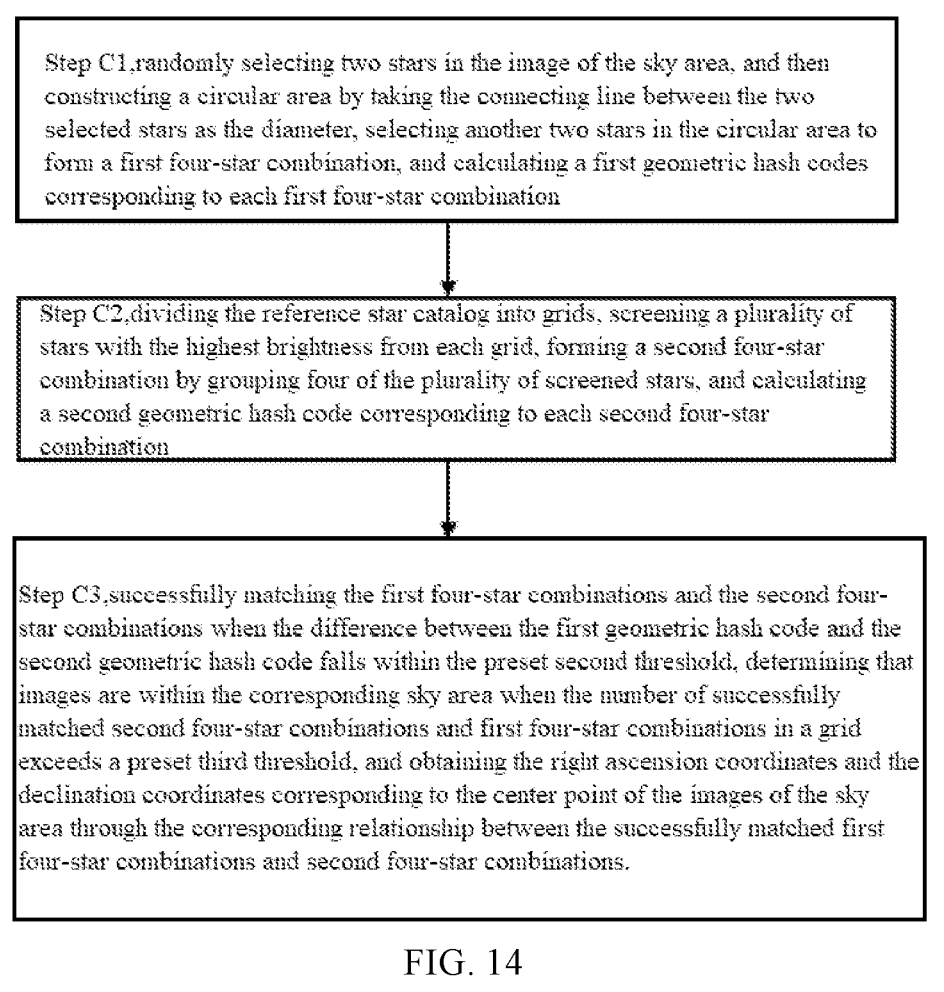

Step C1,randomly selecting two stars in the image of the sky area, and then constructing a circular area by taking the connecting line between the two selected stars as the diameter, selecting another two stars in the circular area to form a first four-star combination, and calculating a first geometric hash codes corresponding to each first four-star combination Step C2,dividing the reference star catalog into grids, screening a plurality of stars with the highest brightness from each grid, forming a second four-star combination by grouping four of the plurality of screened stars, and calculating a second geometric hash code corresponding to each second four-star combination Step C3,successfully matching the first four-star combinations and the second four-star combinations when the difference between the first geometric hash code and the second geometric hash code falls within the preset second threshold, determining that images are within the corresponding sky area when the number of successfully matched second four-star combinations and first four-star combinations in a grid exceeds a preset third threshold, and obtaining the right ascension coordinates and the declination coordinates corresponding to the center point of the images of the sky area through the corresponding relationship between the successfully matched first four-star combinations and second four-star combinations.

FIG. 14

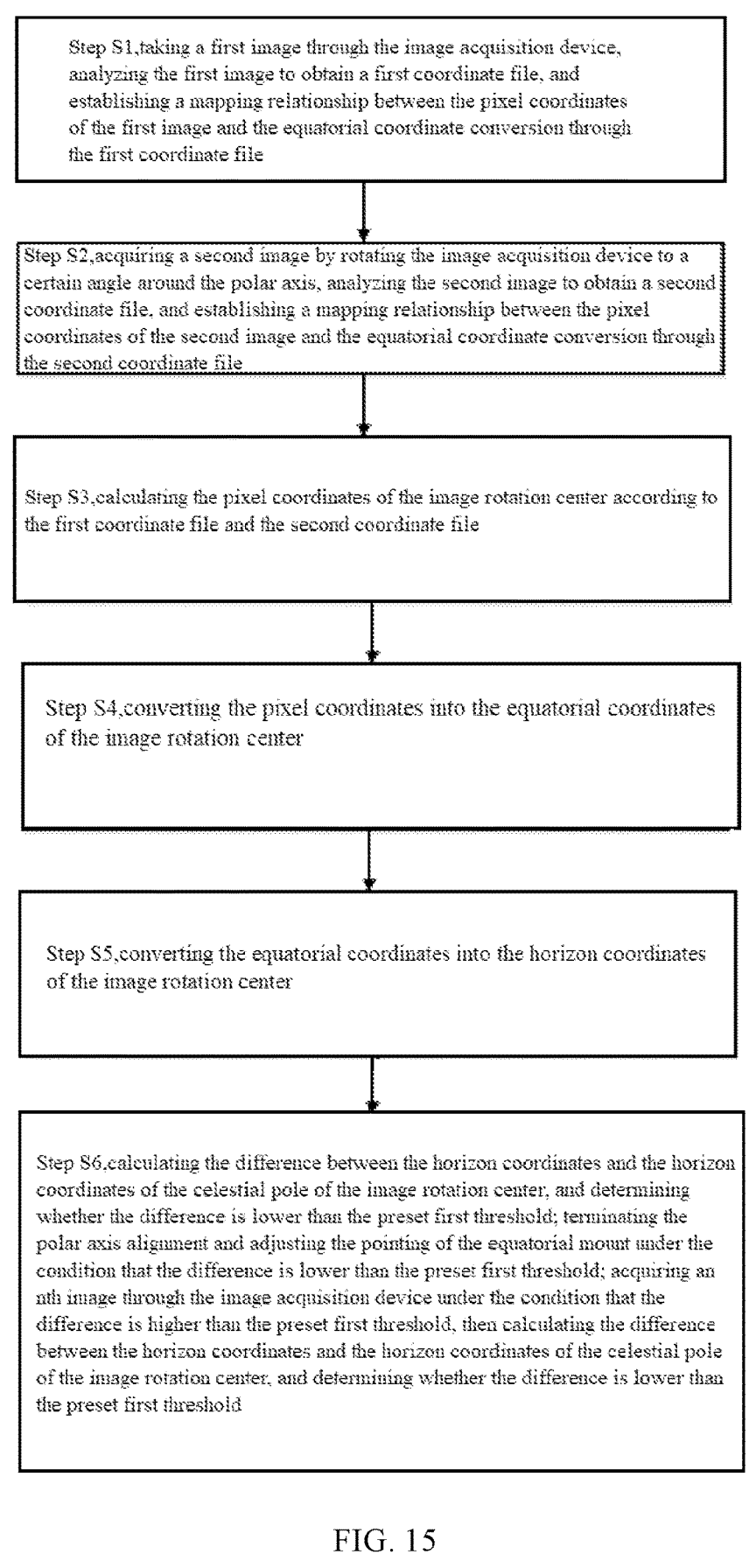

Step S1,taking a first image through the image acquisition device, analyzing the first image to obtain a first coordinate file, and establishing a mapping relationship between the pixel coordinates of the first image and the equatorial coordinate conversion through the first coordinate file Step S2,acquiring a second image by rotating the image acquisition device to a certain angle around the polar axis, analyzing the second image to obtain a second coordinate file, and establishing a mapping relationship between the pixel coordinates of the second image and the equatorial coordinate conversion through the second coordinate file Step S3,calculating the pixel coordinates of the image rotation center according to the first coordinate file and the second coordinate file Step S4,converting the pixel coordinates into the equatorial coordinates of the image rotation center Step S5,converting the equatorial coordinates into the horizon coordinates of the image rotation center Step S6,calculating the difference between the horizon coordinates and the horizon coordinates of the celestial pole of the image rotation center, and determining whether the difference is lower than the preset first threshold; terminating the polar axis alignment and adjusting the pointing of the equatorial mount under the condition that the difference is lower than the preset first threshold; acquiring an nth image through the image acquisition device under the condition that the difference is higher than the preset first threshold, then calculating the difference between the horizon coordinates and the horizon coordinates of the celestial pole of the image rotation center, and determining whether the difference is lower than the preset first threshold

FIG. 15

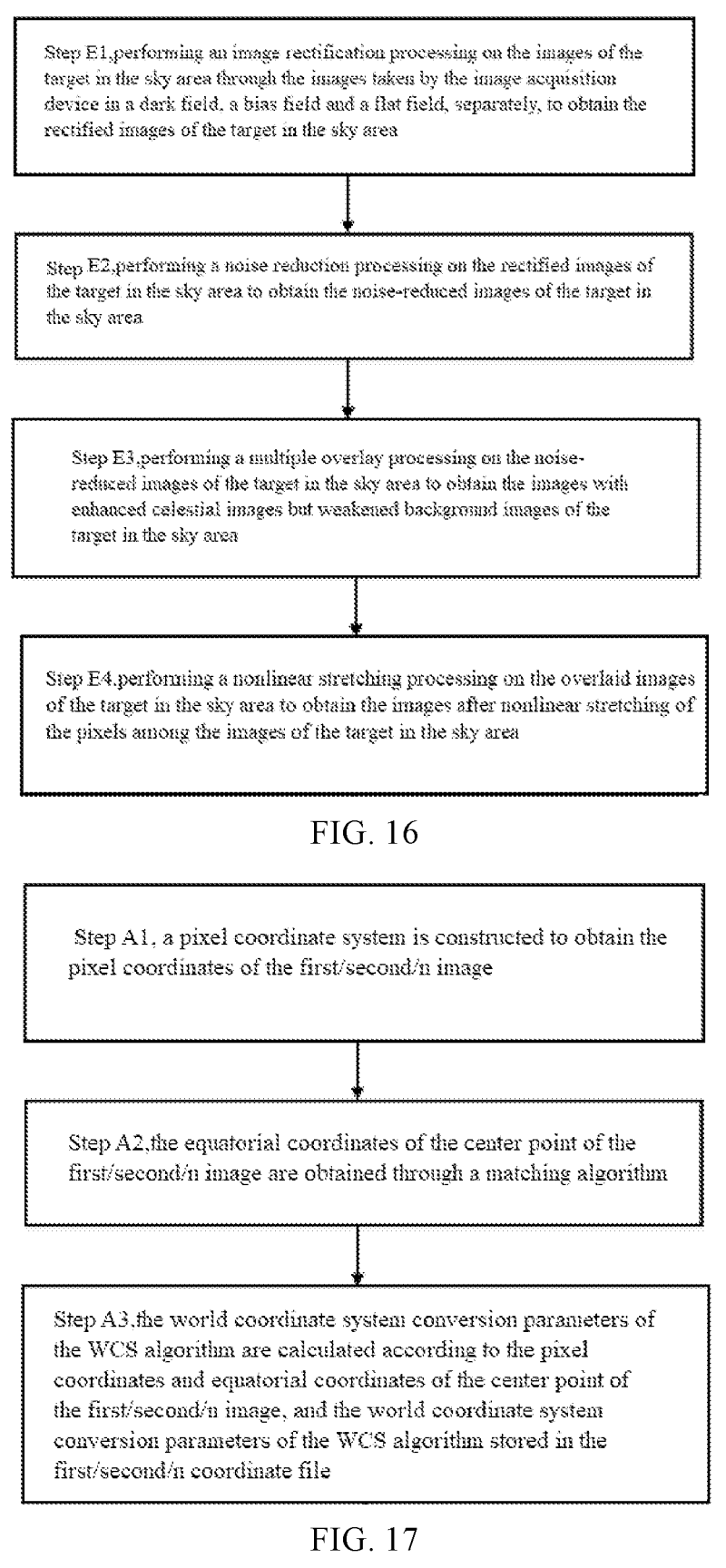

Step E1,performing an image rectification processing on the images of the target in the sky area through the images taken by the image acquisition device in a dark field, a bias field and a flat field, separately, to obtain the rectified images of the target in the sky area Step E2,performing a noise reduction processing on the rectified images of the target in the sky area to obtain the noise-reduced images of the target in the sky area Step E3,performing a multiple overlay processing on the noise-reduced images of the target in the sky area to obtain the images with enhanced celestial images but weakened background images of the target in the sky area Step E4,performing a nonlinear stretching processing on the overlaid images of the target in the sky area to obtain the images after nonlinear stretching of the pixels among the images of the target in the sky area

FIG. 16

Step A1, a pixel coordinate system is constructed to obtain the pixel coordinates of the first/second/n image Step A2,the equatorial coordinates of the center point of the first/second/n image are obtained through a matching algorithm Step A3,the world coordinate system conversion parameters of the WCS algorithm are calculated according to the pixel coordinates and equatorial coordinates of the center point of the first/second/n image, and the world coordinate system conversion parameters of the WCS algorithm stored in the first/second/n coordinate file

FIG. 17

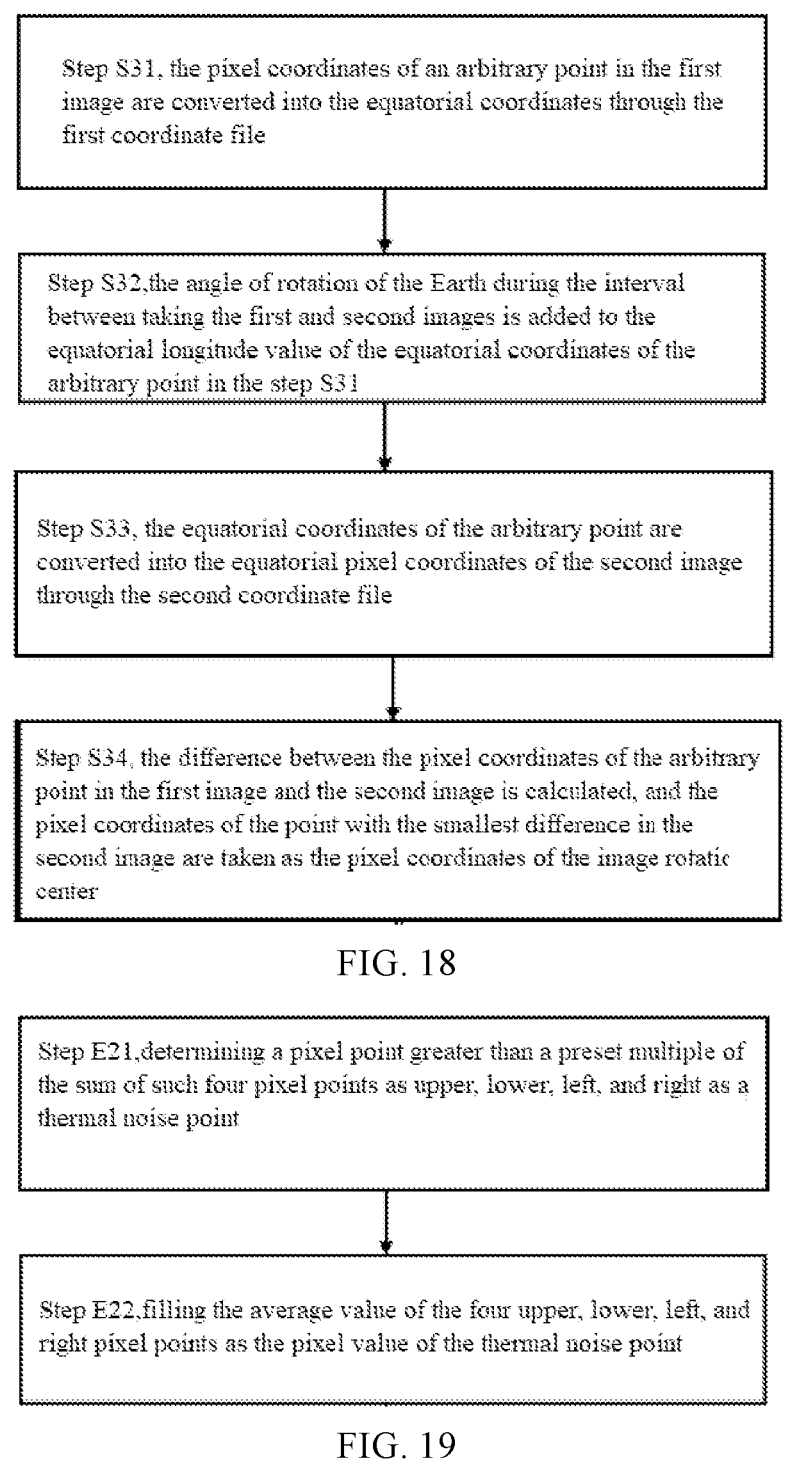

Step S31, the pixel coordinates of an arbitrary point in the first image are converted into the equatorial coordinates through the first coordinate file Step S32,the angle of rotation of the Earth during the interval between taking the first and second images is added to the equatorial longitude value of the equatorial coordinates of the arbitrary point in the step S31

Step S33, the equatorial coordinates of the arbitrary point are converted into the equatorial pixel coordinates of the second image through the second coordinate file Step S34, the difference between the pixel coordinates of the arbitrary point in the first image and the second image is calculated, and the pixel coordinates of the point with the smallest difference in the second image are taken as the pixel coordinates of the image rotatic center

FIG. 18

Step E21,determining a pixel point greater than a preset multiple of the sum of such four pixel points as upper, lower, left, and right as a thermal noise point Step E22,filling the average value of the four upper, lower, left, and right pixel points as the pixel value of the thermal noise point

FIG. 19

METHOD AND ASTROPHOTOGRAPHIC APPARATUS FOR ACQUIRING IMAGES OF TARGETS IN SKY AREA

CROSS-REFERENCE TO RELATED APPLICATIONS

The present application is a continuation application of International Application No. PCT/CN2021/112740, filed on Aug. 16, 2021, which claims priority to Chinese Patent Application No. 202010892311.9, filed on Aug. 31, 2020. The disclosures of the above-mentioned applications are incorporated herein by reference in their entireties.

TECHNICAL FIELD

The present application relates to the technical field of astronomical photography, and further relates to a method and an astrophotographic apparatus for acquiring images of targets in a sky area.

BACKGROUND

With the development of science and technology, astrophotography is becoming more and more popular. Astrophotographic apparatus is commonly used to acquire images of targets in sky area, and how to improve the quality of astrophotographic images taken by the astrophotographic apparatus is one of the urgent problems to be solved at present.

For example, polar axis alignment is one of the very important links in astrophotography, and the quality of polar axis alignment directly affects the accuracy of tracking of an equatorial mount, and then affects the quality of astrophotographic images. Traditionally, people carry out the polar axis alignment through an optical polar-axis mirror of an equatorial mount, and the principle of the method is to install a polar-axis mirror in front of the polar-axis mirror, which indicates the optical center of the polar-axis mirror and the position of Polaris mark. Because the Polaris is not exactly on, but has a distance from the North Celestial Pole, in the actual polar axis adjustment, the position where the Polaris should be on the reticle first needs to be calculated according to the date, the time and the position of the Earth where the equatorial mount is located, the Polaris mark is moved to such position on the reticle in the polar-axis mirror, the horizontal axis and the elevation angle of the equatorial mount are then adjusted, so as to have the actually-seen Polaris adjusted and coincided with the Polaris mark in the polar-axis mirror. However, this operation is relatively complicated, and the error of polar axis alignment is also relatively great.

Later, an electronic polar-axis mirror that takes the images near the North Celestial Pole through the camera appeared, the Polaris in the images is identified through the software method, and a user then adjusts the horizontal axis and the elevation angle of the equatorial mount to move the Polaris to the correct position in the images, thereby realizing the alignment of the polar axis. In this method, the user does not need to calculate the position of the Polaris on the Earth according to the date, the time and the position of the Earth where the equatorial mount is located, which is much simpler than that of an optical polar-axis mirror, but it requires that the Polaris must be included in the images taken, which imposes some restrictions on the user. In conclusion, the existing polar axis alignment method has the following deficiencies: 1. a polar-axis mirror (an optical polar-axis mirror or an electronic polar-axis mirror) arranged coaxial with the polar axis of an equatorial mount must be used to assist the polar axis alignment, which increases the equipment cost; and 2. when the polar axis alignment is performed, the field of view of the polar-axis mirror must be near the celestial poles, which is more difficult for users to operate.

For another example, when photographing a target celestial body, people need to input the right ascension and the declination corresponding to the target celestial body to an astrophotographic apparatus, and an equatorial mount of the astrophotographic apparatus points to the input right ascension and the declination to the target celestial body, so as to photograph the target celestial body in the sky area where the celestial body is located. However, in the actual photographing process, the equatorial mount of the astrophotographic apparatus needs to be pre-positioned in the celestial coordinate system. In the prior art, there is often a phenomenon that the target celestial body does not exist in the final captured image due to the deviation of the pointing of the equatorial mount in the celestial coordinate system. Therefore, how to accurately locate the pointing of the equatorial mount in the celestial coordinate system is one of the difficult problems to be solved at present.

In addition, problems of the astrophotographic apparatus itself or problems of the photography environment, such as ambient brightness (e.g., at night), are one of the factors affecting the quality of the astrophotographic images. Therefore, how to process the photographed images to improve the quality of astrophotographic images is one of the urgent problems to be solved at present.

SUMMARY

The advantages of the present application are to provide method and astrophotographic apparatus for acquiring images of a target in a sky area, which can acquire accurate and high-quality images of the target in the sky area and improve the user experience.

To achieve the above advantages, the present application provides the technical solutions as follows:

a method for acquiring the images of a target in a sky area, including:

step 1, driving an image acquisition device through a controlled rotatable component to point to the position near a target in the sky area, and acquiring the images of the sky area through the image acquisition device according to target right ascension coordinates and target declination coordinates corresponding to a target celestial body received;

step 2, analyzing the images of the sky area to obtain right ascension coordinates and declination coordinates of the center point of images for synchronizing the right ascension coordinates and the declination coordinates to the controlled rotatable component, and determining the pointing of the image acquisition device as the positions of the right ascension coordinates and the declination coordinates;

step 3, driving the image acquisition device by the controlled rotatable component to point to a target position of the target right ascension coordinates and the target declination coordinates corresponding to the target celestial body for the image acquisition device to acquire the images of the target in the sky area according to the target right ascension coordinates and the target declination coordinates corresponding to the target celestial body, as well as the right ascension coordinates and the declination coordinates currently pointed by the image acquisition device; and step 4, performing an image processing on the images of the target in the sky area to obtain the processed images of the target in the sky area.

In one or more embodiments of the present application, the controlled rotatable component is an equatorial mount or a theodolite.

In one or more embodiments of the present application, the step 1 includes the following steps:

A, performing the polar axis alignment to the equatorial mount of the astrophotographic apparatus to enable the right ascension axis of the equatorial mount to be parallel to the axis of rotation of the Earth; and B, photographing the sky area and acquiring the images of the same through the image acquisition device installed on the equatorial mount after the equatorial mount rotates for a certain angle;

the step 2 includes the following steps:

C, matching stars in the image of the sky area with stars in the reference star catalog through the matching algorithm to obtain the right ascension coordinates and the declination coordinates of the center point of the image of the sky area for synchronizing the right ascension coordinates and the declination coordinates to the equatorial mount, and determining that the pointing of the image acquisition device in the celestial coordinate system are the right ascension coordinates and the declination coordinates.

In one or more embodiments of the present application, the step C includes:

step C1, randomly selecting two stars in the image of the sky area, and then constructing a circular area by taking the connecting line between the two selected stars as the diameter, selecting another two stars in the circular area to form a first four-star combination, and calculating a first geometric hash codes corresponding to each first four-star combination;

step C2, dividing the reference star catalog into grids, screening a plurality of stars with the highest brightness from each grid, forming a second four-star combination by grouping four of the plurality of screened stars, and calculating a second geometric hash code corresponding to each second four-star combination; and step C3, successfully matching the first four-star combinations and the second four-star combinations when the difference between the first geometric hash code and the second geometric hash code falls within the preset second threshold, determining that images are within the corresponding sky area when the number of successfully matched second four-star combinations and first four-star combinations in a grid exceeds a preset third threshold, and obtaining the right ascension coordinates and the declination coordinates corresponding to the center point of the images of the sky area through the corresponding relationship between the successfully matched first four-star combinations and second four-star combinations.

In one or more embodiments of the present application, the step A includes the following steps:

S1, taking a first image through the image acquisition device, analyzing the first image to obtain a first coordinate file, and establishing a mapping relationship between the pixel coordinates of the first image and the equatorial coordinate conversion through the first coordinate file;

S2, acquiring a second image by rotating the image acquisition device to a certain angle around the polar axis, analyzing the second image to obtain a second coordinate file, and establishing a mapping relationship between the pixel coordinates of the second image and the equatorial coordinate conversion through the second coordinate file;

S3, calculating the pixel coordinates of the image rotation center according to the first coordinate file and the second coordinate file;

S4, converting the pixel coordinates into the equatorial coordinates of the image rotation center;

S5, converting the equatorial coordinates into the horizon coordinates of the image rotation center; and S6, calculating the difference between the horizon coordinates and the horizon coordinates of the celestial pole of the image rotation center, and determining whether the difference is lower than the preset first threshold; terminating the polar axis alignment and adjusting the pointing of the equatorial mount under the condition that the difference is lower than the preset first threshold; acquiring an $n^{th}$ image through the image acquisition device under the condition that the difference is higher than the preset first threshold, then calculating the difference between the horizon coordinates and the horizon coordinates of the celestial pole of the image rotation center, and determining whether the difference is lower than the preset first threshold.

In one or more embodiments of the present application, the method further includes a step E, which processes the images of a target in the sky area and includes the following steps:

E1, performing an image rectification processing on the images of the target in the sky area through the images taken by the image acquisition device in a dark field, a bias field and a flat field, separately, to obtain the rectified images of the target in the sky area;

E2, performing a noise reduction processing on the rectified images of the target in the sky area to obtain the noise-reduced images of the target in the sky area;

E3, performing a multiple overlay processing on the noise-reduced images of the target in the sky area to obtain the images with enhanced celestial images but weakened background images of the target in the sky area; and E4, performing a nonlinear stretching processing on the overlaid images of the target in the sky area to obtain the images after nonlinear stretching of the pixels among the images of the target in the sky area.

In one or more embodiments of the present application, the step E2 includes the following steps:

E21, determining a pixel point greater than a preset multiple of the sum of such four pixel points as upper, lower, left, and right as a thermal noise point; and E22, filling the average value of the four upper, lower, left, and right pixel points as the pixel value of the thermal noise point.

In one or more embodiments of the present application, the step E3 includes the following steps:

E31, determining star points among the images of the target in the sky area;

E32, determining triangles with the star points as the vertexs;

E33, responding to the number of similar triangles in the two images being greater than a preset threshold to obtain the mapping relationship of the star points in the two images, where the mapping function is $F(x, y)=a1+$

5

6 a2\*x+a3\*y+a4\*x\*y, whereby the parameters a1, a2, a3, a4 are obtained through the matrix method by inputting the pixel values of the 8 star points matched as similar triangles into the function;

E34, inputting all pixel values of the images of the target in the sky area to the mapping function to obtain the image-aligned images of the target in the sky area; and E35, overlaying a plurality of images-aligned images of the target in the sky area and then dividing the number of overlaid images to obtain the images after multiple overlay processing of the target in the sky area.

According to another aspect of the present application, a method for processing images of the sky area is further provided, including the following steps:

performing an image rectification processing on the images of the sky area, rectifying the images of the sky area and the images taken by the image acquisition device in a dark field, a bias field and a flat field, separately, to obtain the rectified images of the sky area;

performing a noise reduction processing on the rectified images of the sky area to obtain the noise-reduced images of the sky area;

performing a multiple overlay processing on the noise-reduced images of the sky area to obtain the images with enhanced celestial images but weakened background images of the sky area; and performing a nonlinear stretching processing on the overlaid images of the sky area to obtain the images after nonlinear stretching of the pixels in the images of the sky area.

According to another aspect of the present application, an astrophotographic apparatus is further provided, including:

a main body;

a storage medium; and a processor, where the processor is connected to the main body, where the storage medium stores program instructions, and the program instructions, when being executed by the processor, cause the processor to execute a method according to the embodiments mentioned above.

According to another aspect of the present application, the beneficial effects that the present application can realize include:

1. driving an image acquisition device through a controlled rotatable component to acquire the images of the sky area near a target in the sky area, determining the pointing of the image acquisition device as the positions of the right ascension coordinates and the declination coordinates, then driving the image acquisition device by the controlled rotatable component to point to a target position of the target right ascension coordinates and the target declination coordinates corresponding to the target sky area according to the target right ascension coordinates and the target declination coordinates corresponding to the target celestial body, as well as the right ascension coordinates and the declination coordinates currently pointed by the image acquisition device, and photographing the target in the sky area and acquiring the images of the same by the image acquisition device, thereby reducing errors;

2. making the right ascension axis of the equatorial mount parallel to the axis of rotation of the Earth through the polar axis alignment, then determining the pointing of the equatorial mount in the celestial coordinate system and enabling the equatorial mount to accurately point to the location of the target celestial body in the sky area, so that the image acquisition device can accurately photograph the sky area where the target celestial body is located and acquire the images of the same;

3. performing the image rectification processing, noise reduction processing, multiple overlay processing and nonlinear stretching processing on the acquired images of the target in the sky area, so that the images have a higher signal-to-noise ratio, better uniformity, stronger contrast and richer celestial detail for improved quality of the images; and 4. compressing the images into JPG images and transmitting them to a mobile terminal, which can transmit the deep-field images with long exposure time (generally more than 5 seconds), thus being beneficial for users to view relatively weak target celestial bodies. Or encoding a plurality of images into a video stream for transmission to the mobile terminal, which can encode successive planetary images with short exposure time (generally less than 0.5 seconds) into a video stream, thus being convenient for users to view planets in the form of video stream.

Further objects and advantages of the present application will be fully reflected from an understanding of the ensuing description and accompanying drawings.

These and other objects, features and advantages of the present application are fully embodied by the following detailed description, accompanying drawings and claims.

BRIEF DESCRIPTION OF THE DRAWINGS

FIG. 1 is a schematic diagram of a method for acquiring images of a target in a sky area according to a preferred embodiment represented in an implementation of the present application.

FIG. 13 shows a flowchart of steps that a controlled rotatable component drives an image acquisition device to point to a position near a target in a sky area of the present application.

FIG. 14 shows a flowchart of steps for obtaining right ascension coordinates and declination coordinates of center point images of a sky area of the present application.

FIG. 15 shows a flowchart of steps that a right ascension axis of an equatorial mount is adjusted to be parallel to an axis of rotation of the Earth of the present application.

FIG. 16 shows a flowchart of steps for processing images of a target in a sky area of the present application.

FIG. 17 shows a flowchart of steps for analyzing coordinate files of the first/second/$n^{th}$ image of the present application.

FIG. 18 shows a flowchart of steps for calculating pixel coordinates of an image rotation center according to a first coordinate file and a second coordinate file of the present application.

FIG. 19 shows a flowchart of steps for performing a noise reduction processing on images of a target in a sky area of the present application.

DETAILED DESCRIPTION OF THE EMBODIMENTS

Figure 2:
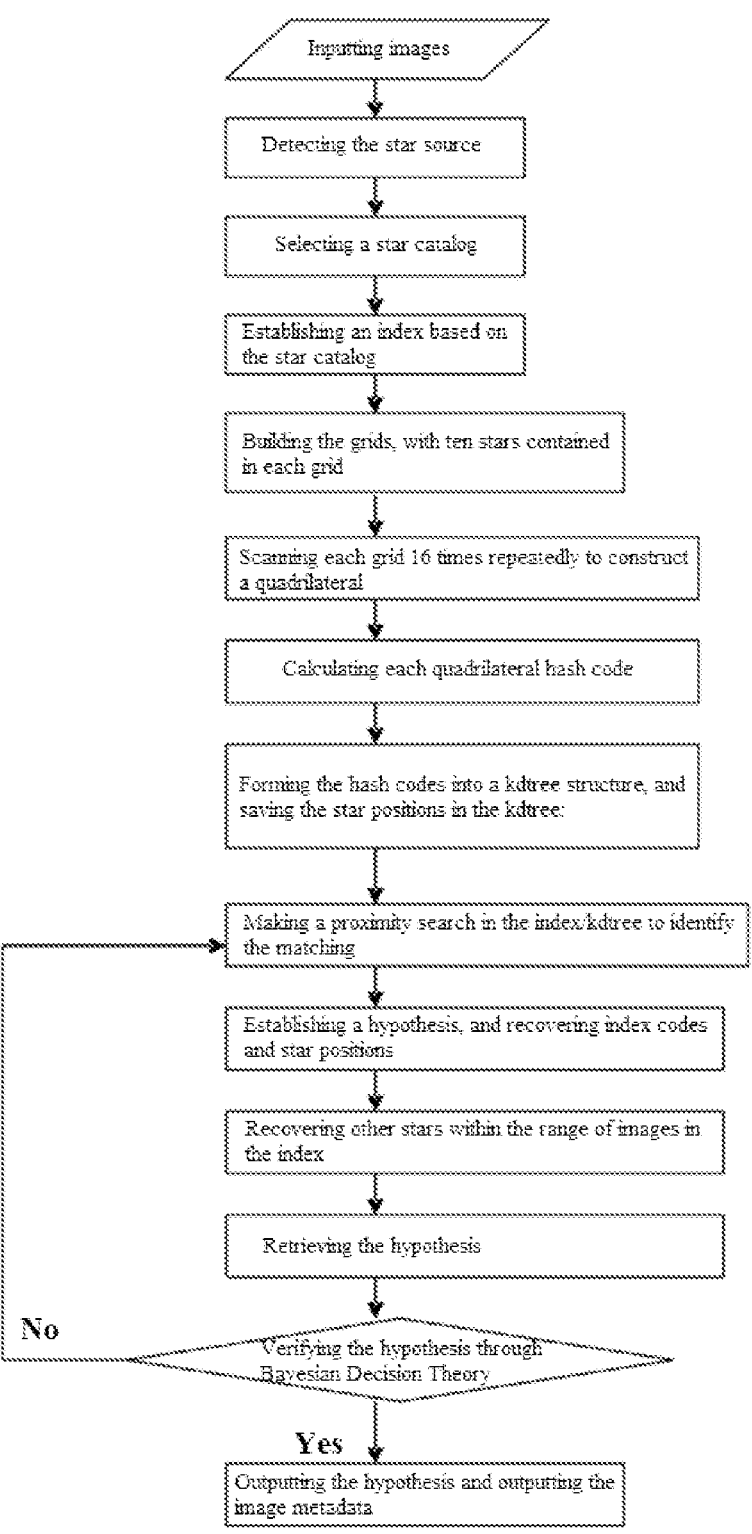
FIG. 2 is an algorithm flowchart of a matching algorithm in the method according to the above preferred embodiment represented in an implementation of the present application.

The present application will be described in detail below with reference to the specific embodiments shown in the accompanying drawings. However, these embodiments do not limit the present application, and any structural, method, or functional changes made by those skilled in the art according to these embodiments are all included in the protection scope of the present application.

It should be understood by those skilled in the art that in the disclosure of the present application the orientation or position relationships indicted by the terms "portrait", "horizontal", "upper", "lower", "front", "rear", "left", "right", "vertical", "horizontal", "top", "bottom", "interior", "exterior" and the like are based on orientation or position relationships shown in the drawings, merely for the convenience of describing the present application and simplifying the description, instead of indicating or implying that the indicated device or element must have particular orientations or be constructed and operated in particular orientations. Therefore, these terms cannot be construed as a limitation to the present application.

It should be understood that the term "one" should be understood as "at least one" or "one or more", that is, in one embodiment, the number of an element may be one, while in another embodiment, the number of the element may be one. The number may be plural, and the term "one" should not be understood as a limitation to the number.

In the statement of the description, description with reference to terms of "one embodiment", "some embodiments", "example(s)", "specific example", or "some examples" means that specific features, structures, materials, or characteristics described in combination with the embodiment(s) or example(s) are included in at least one embodiment or example of the present application. In the description, schematic description of the above terms does not necessarily refer to the same embodiment or example. Moreover, specific features, structures, materials or characteristics described may be combined in any suitable manner in any one or more embodiments or examples. In addition, those skilled in the art may combine and integrate different embodiments or examples, as well as features of these different embodiments or examples described in the description, without conflicting with each other.

Referring to FIG. 1, which is a schematic diagram of a method for acquiring images of a target a sky area according to a preferred embodiment represented in an implementation of the present application. As shown in FIG. 1, a method for acquiring images of a target in a sky area includes:

step 1, an image acquisition device is driven through a controlled rotatable component to point to the position near a target in the sky area, and images of the sky area is acquired through the image acquisition device according to target right ascension coordinates and target declination coordinates corresponding to a target celestial body received;

step 2, images of the sky area are analyzed to obtain right ascension coordinates and declination coordinates of the center point of images for synchronizing the right ascension coordinates and the declination coordinates to the controlled rotatable component, and the pointing of the image acquisition device are determined as positions of the right ascension coordinates and the declination coordinates;

step 3, the image acquisition device is driven by the controlled rotatable component to point to a target position of the target right ascension coordinates and the target declination coordinates corresponding to the target celestial body for the image acquisition device to acquire the images of the target in the sky area according to the target right ascension coordinates and the target declination coordinates corresponding to the target celestial body, as well as the right ascension coordinates and the declination coordinates currently pointed by the image acquisition device; and step 4, an image processing is performed on the images of the target in the sky area to obtain the processed images of the target in the sky area.

In the step 1, in case of intending to photograph a target celestial body, a user only needs to input the information of the corresponding celestial body, such as name or coordinates of the celestial body and the like, the system searches the celestial body database for the right ascension coordinates and the declination coordinates of the corresponding celestial body, the information is sent to the controlled rotatable component, and the controlled rotatable component then drives the image acquisition device to point to the input right ascension coordinates and the declination coordinates, namely, the sky area where the target celestial body is located, and the image acquisition device photographs the sky area and acquires the images of the same. The celestial body database stores the information of celestial bodies, such as the information on coordinates, name thereof, and the like.

It should be pointed out that, in general, due to system errors or errors in the controlled rotatable component, the controlled rotatable component is unable to drive the image acquisition device to accurately point to the location of the target celestial body, that is, the image acquisition device points to the position near the target in the sky area. That is to say, there is a certain deviation between the position near the target celestial body and the position where the target celestial body is located. In which case, the image acquisition device acquires the images of the sky area in the position near the target celestial body, that is, the target celestial body may deviate from the center position of the images of the sky area.

Preferably, the controlled rotatable component is an equatorial mount or a theodolite. In other optional embodiments, the controlled rotatable component may also be other mobile devices capable of driving the image acquisition device, which is not limited herein.

In the step 2, the right ascension coordinates and the declination coordinates of the center point of images of the sky area are obtained by analyzing the images of the sky area, and the right ascension coordinates and the declination coordinates are synchronized to the controlled rotatable component, so that the controlled rotatable component determines that it is currently pointing to the right ascension coordinates and the declination coordinates, that is, it is determined that the image acquisition device is currently pointing to the positions where the right ascension coordinates and the declination coordinates are located. The controlled rotatable component generally has a synchronization interface, and it is only necessary to synchronize the obtained right ascension coordinates and the declination coordinates of the center point of the images of the sky area to the controlled rotatable component through the synchronization interface, the controlled rotatable component may then determine the pointing in the celestial coordinate system as the right ascension coordinates and the declination coordinates.

In the step 3, the controlled rotatable component drives the image acquisition device to point to the target right ascension coordinates and the target declination coordinates corresponding to the target celestial body according to the target right ascension coordinates and the target declination coordinates corresponding to the target celestial body, as well as the right ascension coordinates and the declination coordinates currently pointed by the image acquisition device, such as coordinate deviation values, and the like, and the image acquisition device then photographs the target in the sky area and acquires the images of the same, thereby reducing errors.

In order to further improve the quality of images, in the step 4, images of the target in the sky area with better quality of images can be obtained by performing an image processing on the images of the target in the sky area.

As shown in FIG. 13, in the present embodiment, the controlled rotatable component is implemented as an equatorial mount, and the step 1 includes the following steps:

A, the polar axis alignment is performed to the equatorial mount of the astrophotographic apparatus, so that the right ascension axis of the equatorial mount is parallel to the axis of rotation of the Earth; and B, images of the sky area are taken and acquired through the image acquisition device installed on the equatorial mount after the equatorial mount rotates for a certain angle; the step 2 includes the following steps:

C, matching stars in the image of the sky area with stars in the reference star catalog through the matching algorithm to obtain the right ascension coordinates and the declination coordinates of the center point of the image of the sky area for synchronizing the right ascension coordinates and the declination coordinates to the equatorial mount, and determining that the pointing of the image acquisition device in the celestial coordinate system are the right ascension coordinates and the declination coordinates.

Preferably, in the step B, the equatorial mount is offset by at least 5° from the North Celestial Pole. That is to say, in the step A, the zero point of the equatorial mount points to the North Celestial Pole, and then, in the step B, the rotation angle of the equatorial mount is at least 5 degrees, so that the equatorial mount is offset by at least 5 degrees from North Celestial Pole, in which case, the image acquisition device installed on the equatorial mount photographs the sky area to which it currently points and acquires the images of the same, so as to prevent a positioning failure.

In the present embodiment, in the step C, stars in the image of the sky area match with the stars in the reference star catalog through the matching algorithm, under the conditions that stars in the images of the sky area successfully match with stars in a certain sky area of the reference star catalog, it is determined that the equatorial mount is currently pointing to the sky area, thereby determining that the pointing of the equatorial mount are the right ascension coordinates and the declination coordinates. Preferably, the reference star catalog is the USNO-B star catalog or the Two Micron All Sky Survey star catalog, or the star catalog of other template libraries (such as the NGC star catalog), which is not limited herein.

More preferably, FIG. 2 shows an algorithm flowchart of a matching algorithm of an example of the present preferred embodiment. The matching algorithm is a quadrilateral matching algorithm, and on the basis of establishing a quadrilateral index based on the combination of the USNO-B star catalog and the Two Micron All Sky Survey star catalog, the quadrilateral matching algorithm observes the changes in image matching time and matching rate of the system under the environments of different image qualities, changes in image passband, changes in the area of the sky area occupied by images, changes in density of the index quadrilateral, and the like, respectively. Data of the celestial body generated by the images of the sky area, including the telescope pointing of the images, image scale and orientation of images, are measured through the matching algorithm, and the method of grid table is used for establishing a quadrilateral index in the reference star catalog, which is stored with quadrilateral hash codes obtained from the kdtree data structure (a data structure for partitioning the K-dimensional data space). Through each quadrilateral hash code generated in the images, hash codes within the threshold range in the kdtree data structure are found and a hypothesis is established, and the Bayesian Decision Theory is used for verifying the hypothesis. When the hypothesis is true, matching becomes successful and the results are output.

Figure 10:
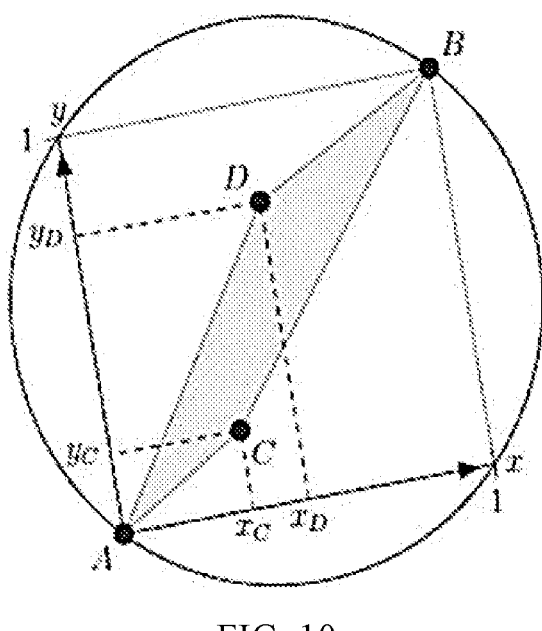
FIG. 10 is a schematic diagram of the principle of a geometric hash codes corresponding to a four-star combination according to the above preferred embodiment represented in an implementation of the present application.
Figure 11:
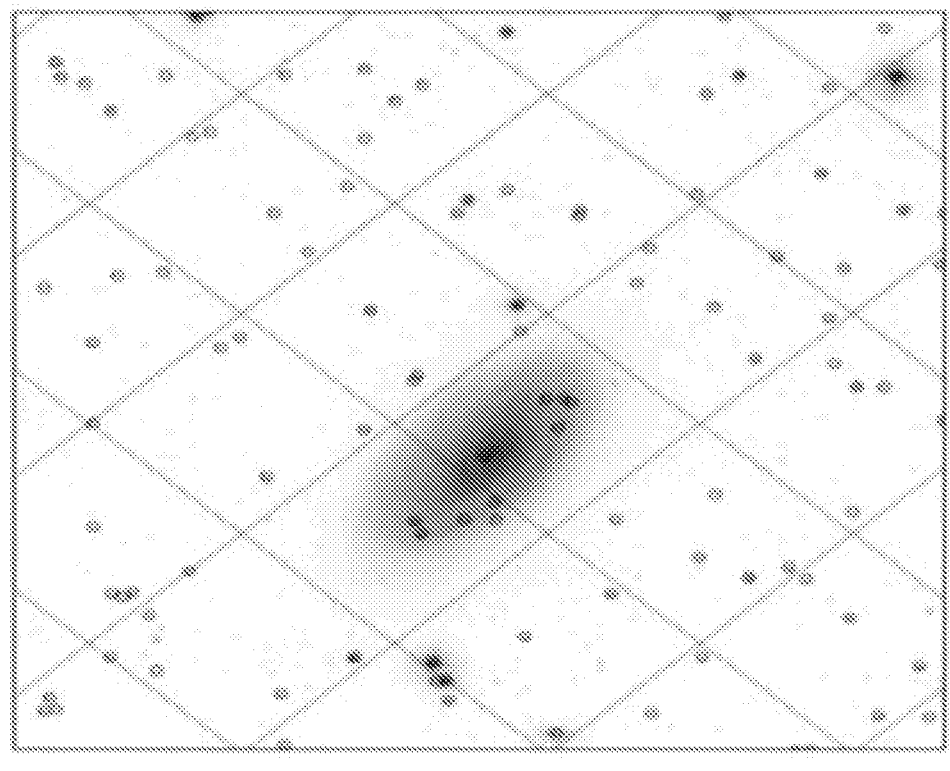
FIG. 11 is a schematic diagram of a reference star catalog according to the above preferred embodiment represented in an implementation of the present application.
Figure 12:
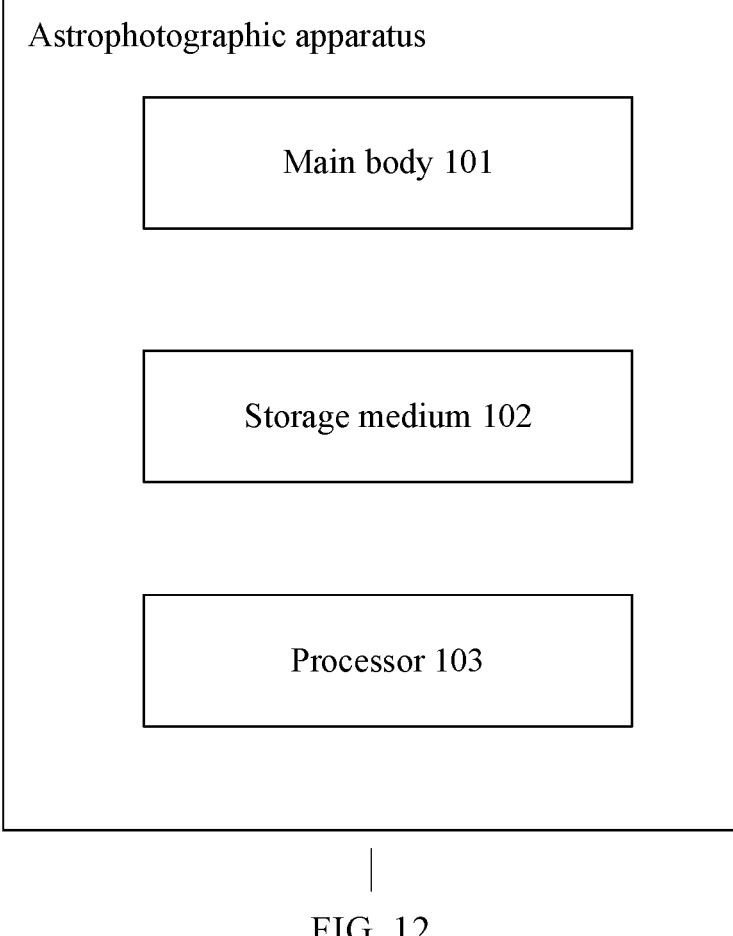
FIG. 12 is a schematic block diagram of an astrophotographic apparatus according to the above preferred embodiment represented in an implementation of the present application.

Further, in the present embodiment, as shown in FIG. 14, the step C includes:

step C1, as shown in FIG. 10, two stars in the image of the sky area are randomly selected and denoted as A and B, the coordinates of Star A are denoted as (0,0), the coordinates of Star B are denoted as (1,1), and a circular area with AB as the diameter is constructed. Another two stars in the circular area are selected and denoted as C and D, the coordinates of Star C and Star D are denoted as $(x_c, y_c)$ and $(x_d, y_d)$, respectively, and ABCD form a first four-star combination. First geometric hash codes corresponding to all first four-star combinations are then calculated. Geometric hash code refers to a four-dimensional vector $(x_c, y_c, x_d, y_d)$, which describes the relative position of the four stars, and the geometric hash code is invariant in the case of image translation, scale transformation and image rotation. In order to prevent C and D from becoming symmetry, this symmetry is broken by letting $x_c < x_d$ and $x_c + x_d \leq 1$.

step C2, as shown in FIG. 11, in order to prevent star points in the reference star catalog from participating in the matching, resulting in too much computation, the reference star catalog is divided into grids, and a plurality of stars with the highest brightness (preferably the first 10 stars) are screened from each grid, a second four-star combination is formed by grouping four of the plurality of screened stars, and a second geometric hash code corresponding to each second four-star combination is calculated. The method for calculating the second geometric hash code is the same as that in the step C1.

step C3, successfully matching the first four-star combinations successfully matches the second four-star combinations when the difference between the first geometric hash code and the second geometric hash code falls within the preset second threshold. It is determined that the images are within the corresponding sky area when the number of successfully matched second four-star combinations and first four-star combinations in a grid exceeds a preset third threshold, and the equatorial coordinates corresponding to the center point of the images are obtained through the corresponding relationship between the successfully matched first four-star combinations and second four-star combinations.

It is worth mentioning that in the step C, the equatorial mount generally has a synchronization interface, and it is only necessary to synchronize the obtained right ascension coordinates and the declination coordinates of the center point of the images of the sky area to the equatorial mount through the synchronization interface, the equatorial mount is capable of determining the pointing in the celestial coordinate system as the right ascension coordinates and the declination coordinates.

Figure 6:
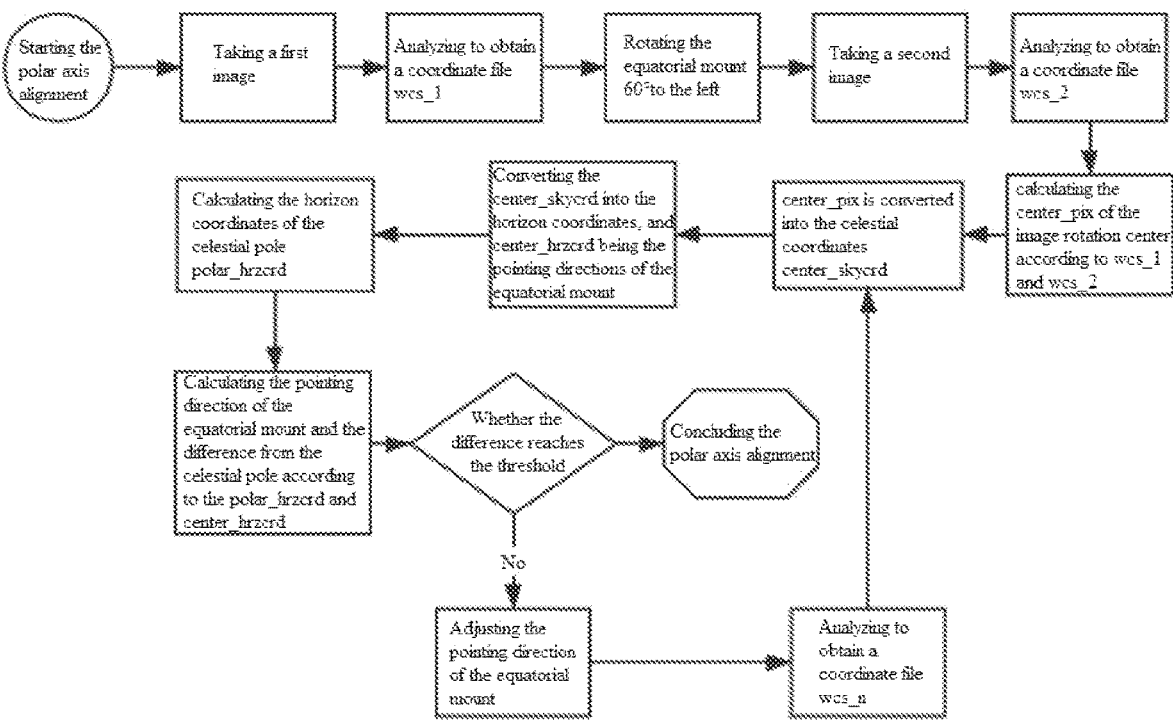
FIG. 6 is a schematic flow diagram of a polar axis alignment method of an astrophotographic apparatus according to the above preferred embodiment represented in an implementation of the present application.
Figure 7:
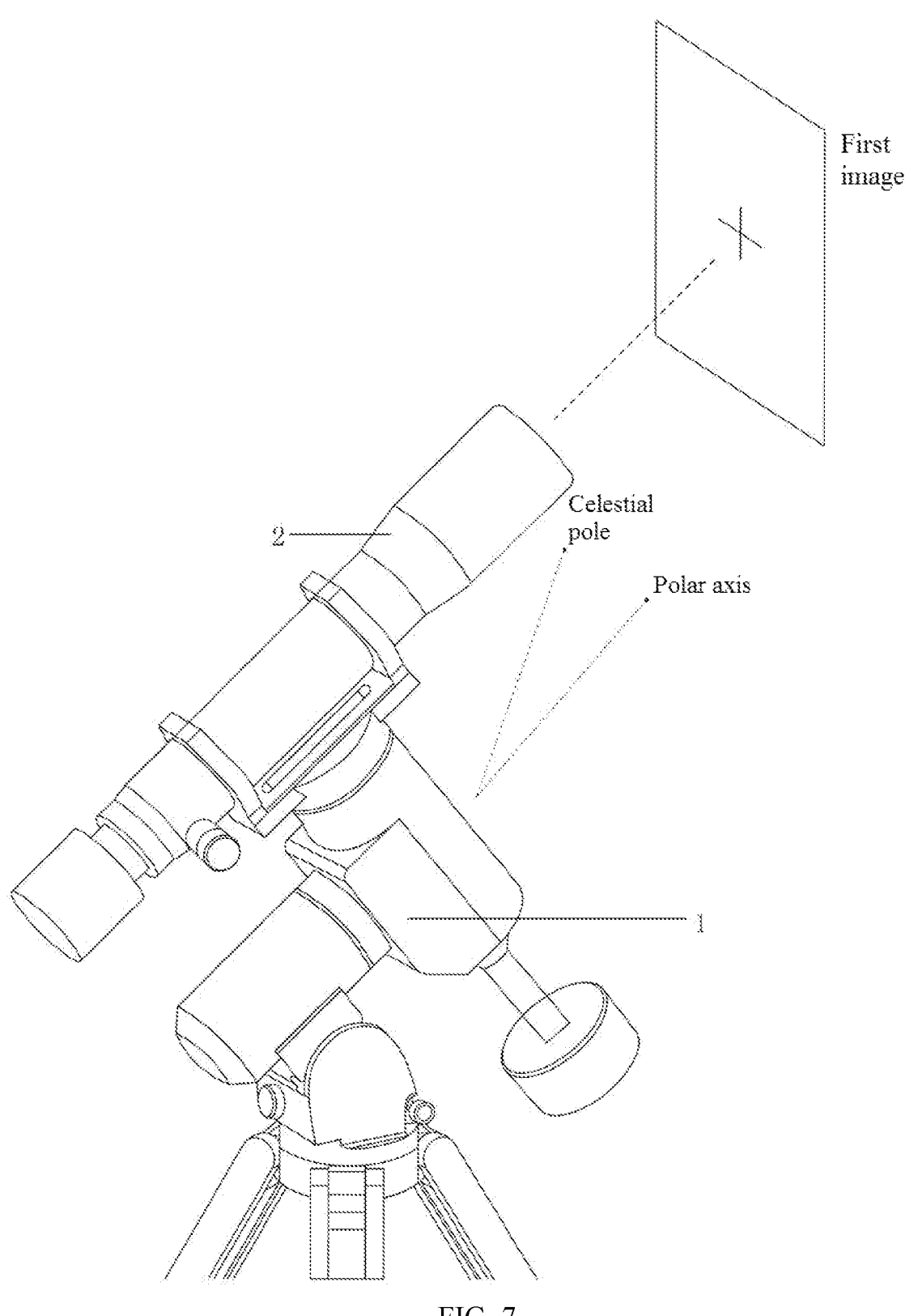
FIG. 7 is a schematic diagram of a first image taken by an image acquisition device installed on an equatorial mount according to the above preferred embodiment represented in an implementation of the present application.
Figure 8:
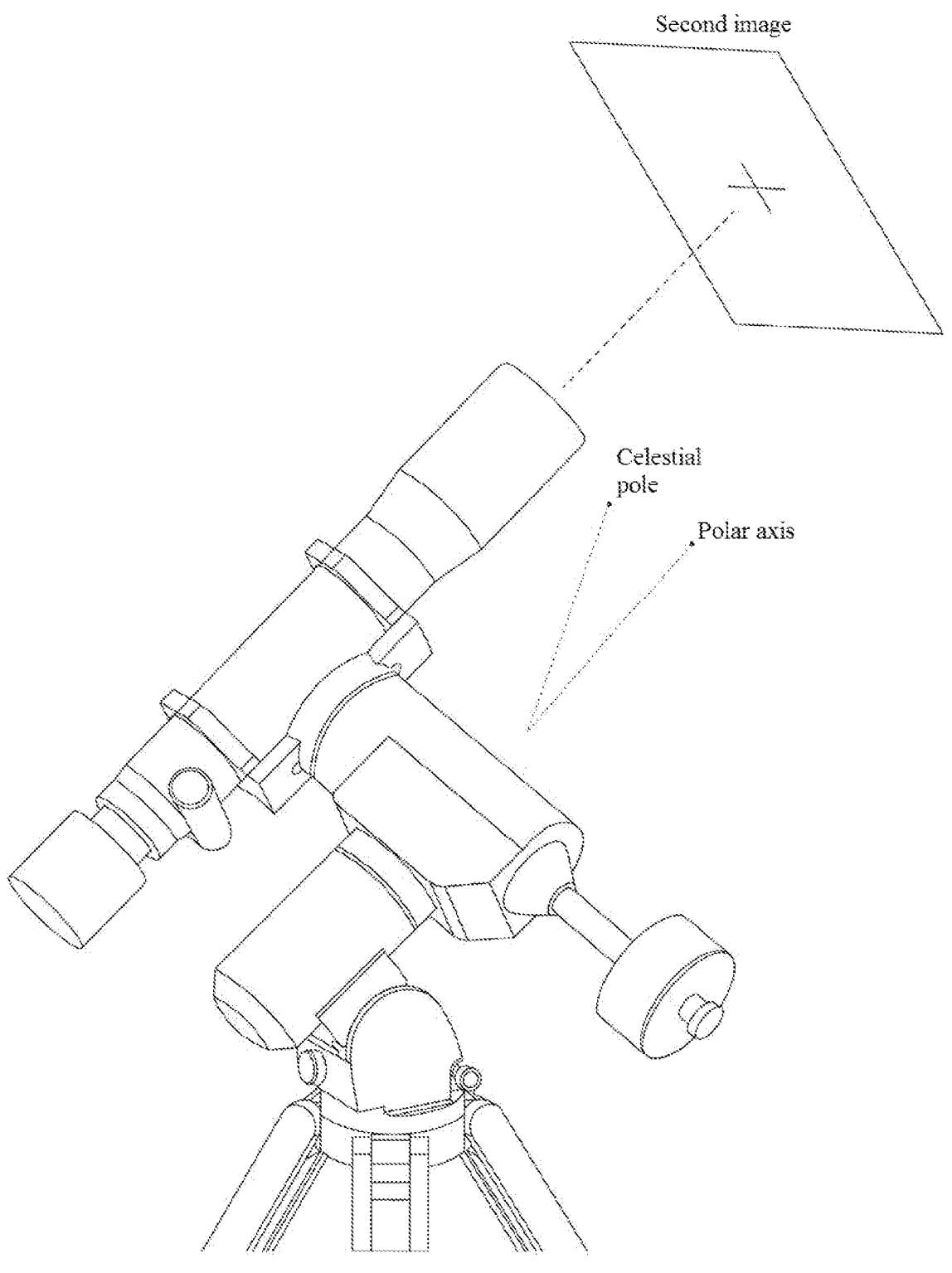
FIG. 8 is a schematic diagram of a second image taken by rotating the image acquisition device to a certain angle around the polar axis according to the above preferred embodiment represented in an implementation of the present application.
Figure 9:
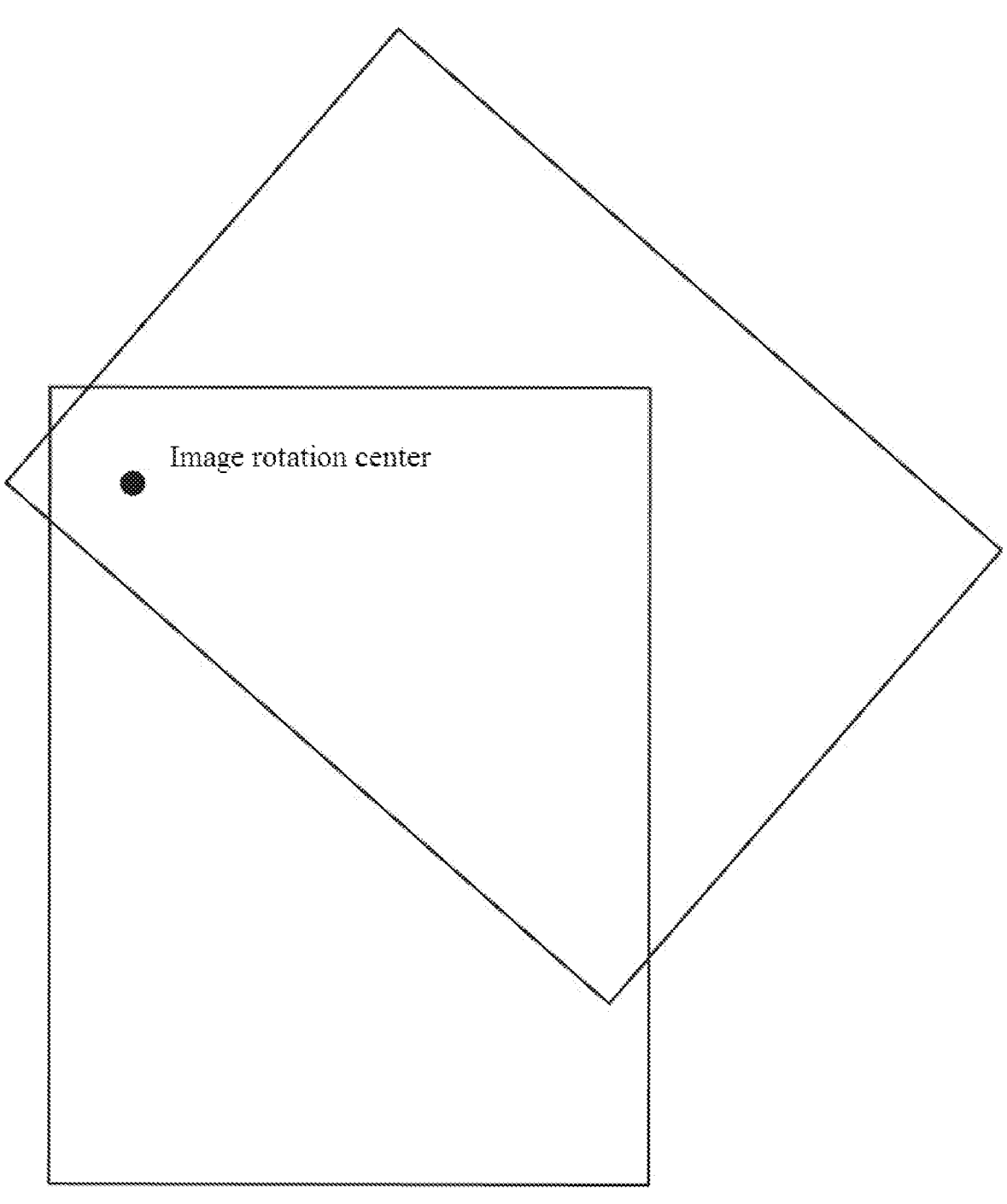
FIG. 9 is a schematic diagram of the first and second images and the image rotation center according to the above preferred embodiment represented in an implementation of the present application.

In an embodiment, as shown in FIG. 6 and FIG. 15, the step A includes the following steps:

S1, first of all, the equatorial mount is adjusted to the zero position, a first image is taken by the image acquisition device 2 installed on the equatorial mount 1 (as shown in FIG. 7), the first image is analyzed to obtain a first coordinate file, and a mapping relationship between the pixel coordinates of the first image and the equatorial coordinates conversion is established through the first coordinate file;

S2, a second image is acquired by rotating the image acquisition device to a certain angle around the polar axis (as shown in FIG. 8), the second image is analyzed to obtain a second coordinate file, and a mapping relationship between the pixel coordinates of the second image and the equatorial coordinate conversion is established through the second coordinate file;

S3, the pixel coordinates of the image rotation center (as shown in FIG. 9) are calculated according to the first coordinate file and the second coordinate file;

S4, the pixel coordinates are converted into the equatorial coordinates of the image rotation center;

S5, the equatorial coordinates are converted into the horizon coordinates of the image rotation center; and S6, the difference between the horizon coordinates and the horizon coordinates of the celestial pole of the image rotation center is calculated, and it is determined whether the difference is lower than the preset first threshold; the polar axis alignment is terminated under the condition that the difference is lower than the preset first threshold, and the pointing of the equatorial mount is adjusted. An $n^{th}$ image is acquired through the image acquisition device under the condition that the difference is higher than the preset first threshold, the difference between the horizon coordinates and the horizon coordinates of the celestial pole of the image rotation center is then calculated, and it is determined whether the difference is lower than the preset first threshold.

Figure 3:
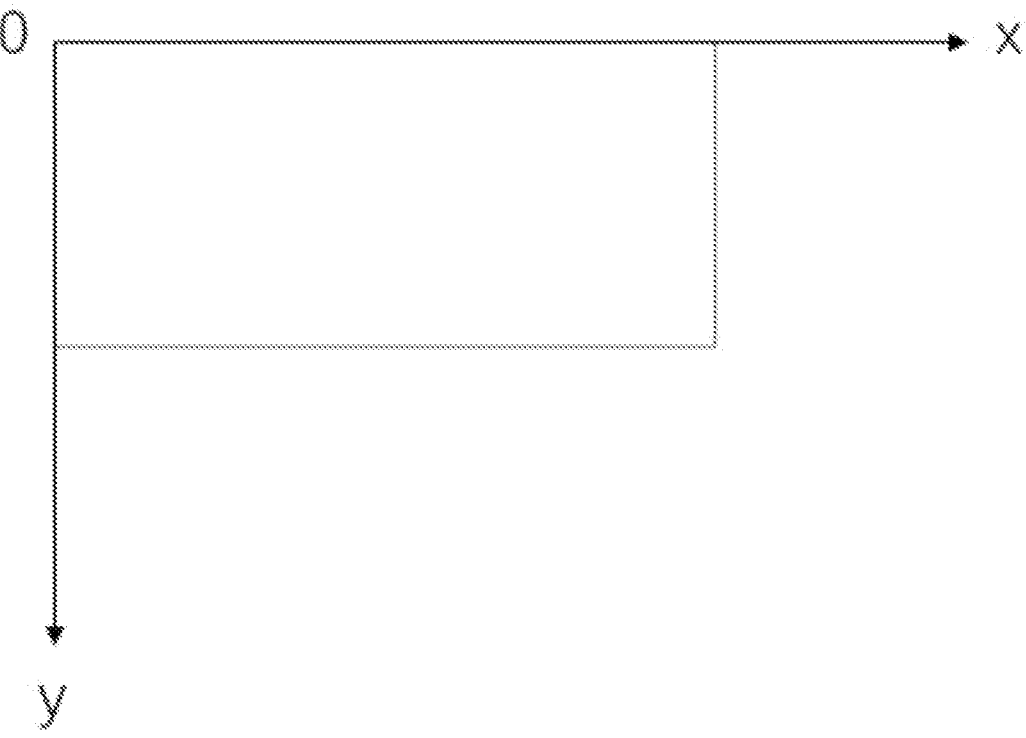
FIG. 3 is a schematic diagram of a constitution of the pixel coordinate system according to the above preferred embodiment represented in an implementation of the present application.

Pixel coordinates are coordinates in a pixel coordinate system, as shown in FIG. 3, a pixel coordinate system is a coordinate system used to describe a positional relationship of pixels in an image. Usually, the upper left corner of the image is taken as the origin, the rightward direction is the positive direction of the x-axis, and the downward direction is the positive direction of the y-axis.

Equatorial coordinates are the coordinates in the equatorial coordinate system, and the horizon coordinates are the coordinates in the horizon coordinate system. Both the equatorial coordinate system and the horizon coordinate system are commonly used celestial coordinate systems, and are the spherical coordinate systems established for determining the position of an celestial body in the celestial sphere (celestial sphere is an imaginary spherical surface sphere that takes an observer as the center of the sphere, and an arbitrary length as the radius).

Figure 4:
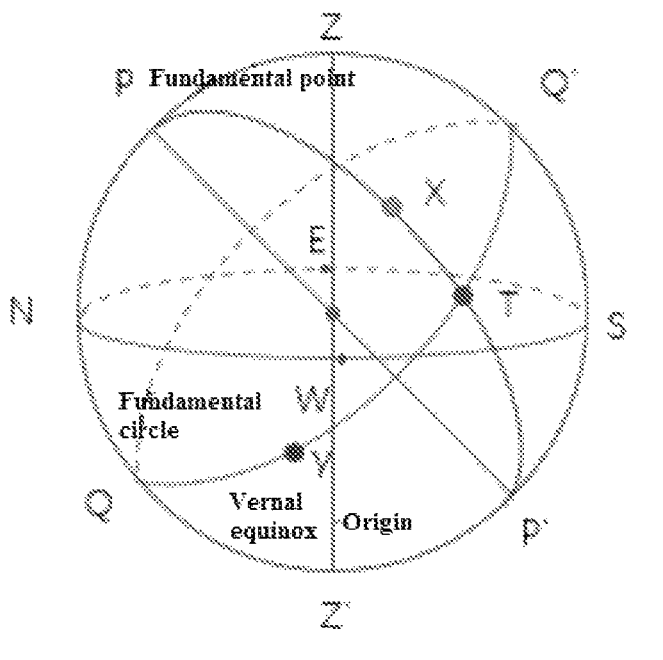
FIG. 4 is a schematic diagram of a constitution of the equatorial coordinate system according to the above preferred embodiment represented in an implementation of the present application.

Referring to FIG. 4, the equatorial coordinate system takes the celestial equator as the fundamental circle and the vernal equinox y as the origin. The arc $\gamma T$ is the first coordinates of a celestial body X in the equatorial coordinate system, called the right ascension and denoted as $\alpha$. The right ascension of a celestial body is measured counterclockwise from the vernal equinox, and from 0 h to 24 h (or 0°~360°).

The arc XT is the second coordinates of the celestial body X in the equatorial coordinate system, called the declination and denoted as $\delta$.

Because the vernal equinox moves together with the celestial body, the right ascension $\alpha$ and the declination $\delta$ of any celestial body in the equatorial coordinate system may not change due to the observation of an observer at different locations or different times. Therefore, the equatorial coordinate system is widely used in the astrometry.

Figure 5:
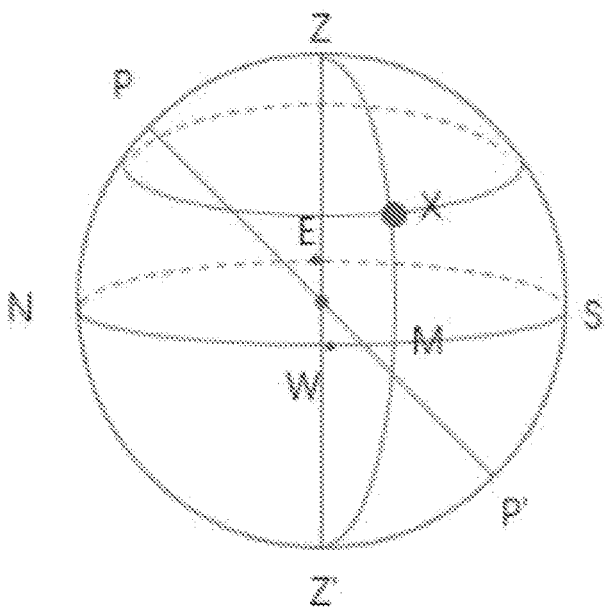
FIG. 5 is a schematic diagram of a constitution of the horizon coordinate system according to the above preferred embodiment represented in an implementation of the present application.

Referring to FIG. 5, the horizon coordinate system is the most intuitive and convenient celestial coordinate system for observers. The horizon coordinate system takes the horizon circle as the fundamental circle, the zenith Z as the fundamental point, and the south point S (or the north point N) as the origin. All the great circles that pass through the zenith and nadir and are perpendicular to the horizon circle are collectively called the azimuth circle, and all the circles that are parallel to the horizon circle are called the almucantar. Assuming that there is a celestial body X that passes through X and intersects the azimuth circle at M on the horizon circle, the great arc SM is the first coordinates of the celestial body X, which are called the horizon longitude or azimuth of the celestial body and denoted as A, while the great arc is the second coordinates of the celestial body X, which are called the horizon latitude or altitude angle and denoted as h. The horizon latitude is measured from the horizon circle to the zenith, ranging from 0°-90°, and measured to the nadir, ranging from 0°--90°. For celestial bodies closer to the zenith, the great arc ZX is also used to replace the horizon latitude, which is called the zenith distance and denoted as z. The zenith distance is measured from the zenith to the nadir, ranging from 0°-180°, obviously: $z=90°-h$.

In the present application, the coordinate conversion from the pixel coordinate system to the equatorial coordinate system is realized by a software program containing the world coordinate system (WCS) algorithm (WCS algorithm is an algorithm for mutual conversion between image pixel coordinates and celestial coordinates proposed by E. W. Greisen and M. R. Calabretta in 2002. Different coordinate conversion functions are constructed according to different projection methods from the sphere to the plane). The coordinate conversion from the pixel coordinate system to the equatorial coordinate system can be divided into two steps, the first step is to convert from the pixel coordinate system to the world coordinate system, and the second step is to convert from the world coordinate system to the equatorial coordinate system.

The WCS is an intermediate coordinate system used when the pixel coordinate system and the celestial coordinate system (equatorial coordinate system) are converted to each other, and its purpose is to establish a link between the pixel coordinate system and the celestial coordinate system. The coordinate file acquired by analyzing the images contains the world coordinate system conversion parameters of the WCS algorithm, these parameters are the coefficients used when the pixel coordinate system and the celestial coordinate system are converted to each other. By using these parameters, the coordinate conversion between the pixel coordinate system and the celestial coordinate system can be realized.

Trough the software program containing the WCS algorithm, the world coordinate system conversion parameters of the WCS algorithm can be calculated according to the pixel coordinates and equatorial coordinates of the image center point, which, however, involves redundant operations and slow matching speed in the process of analyzing the equatorial coordinates of the image center point. The present application accelerates the acquisition of the equatorial coordinates corresponding to the image center point through a matching algorithm.

As a further improved technical solution of the present application, the image acquisition device is the main lens of an astronomical telescope.

As a further improved technical solution of the present application, the image acquisition device in the step S2 rotates around the polar axis by 60°-180° to acquire the second image.

Further, in the step S6, calculating the horizon coordinates of the image rotation center includes the following steps: the nth image is analyzed to obtain the nth coordinate file, the mapping relationship between the pixel coordinates of the nth image and the equatorial coordinate conversion is established through the nth coordinate file, the pixel coordinates of the image rotation center are converted to the equatorial coordinates, and the equatorial coordinates of the image rotation center are converted to the horizon coordinates.

Further, as shown in FIG. 17, analyzing the first/second/n image to obtain the first/second/n coordinate file includes the following steps:

step A1, a pixel coordinate system is constructed to obtain the pixel coordinates of the first/second/n image;

step A2, the equatorial coordinates of the center point of the first/second/n image are obtained through a matching algorithm;

step A3, the world coordinate system conversion parameters of the WCS algorithm are calculated according to the pixel coordinates and equatorial coordinates of the center point of the first/second/n image, and the world coordinate system conversion parameters of the WCS algorithm stored in the first/second/n coordinate file.

Further, as shown in FIG. 18, calculating the pixel coordinates of the image rotation center according to the first coordinate file and the second coordinate file in the step 3 including the following steps:

step S31, the pixel coordinates of an arbitrary point in the first image are converted into the equatorial coordinates through the first coordinate file;

step S33, the equatorial coordinates of the arbitrary point are converted into the equatorial pixel coordinates of the second image through the second coordinate file;

step S34, the difference between the pixel coordinates of the arbitrary point in the first image and the second image is calculated, and the pixel coordinates of the point with the smallest difference in the second image are taken as the pixel coordinates of the image rotation center.

The pixel coordinates of a certain point in the first image are first converted to the equatorial coordinates, and then the pixel coordinates of the point with the same equatorial coordinates in the second image are identified. Because the image acquisition device rotates around the polar axis before the second image is taken, the pixel coordinates corresponding to the polar axis in the first and second images are the same, and the point with the same equatorial coordinates and the smallest difference in the pixel coordinates in the two images are identified, which is simply the pixel coordinates of the polar axis.

In the present embodiment, the quasi-Newton algorithm is preferably used to calculate the point with the smallest pixel coordinate difference in the two images.

During the interval between taking the first and second images, the Earth has been rotating, the second image taken thus includes the movement of the image acquisition device around the polar axis, and the movement caused by the rotation of the Earth as well. That is, a point in the first image is displaced by rotation around the celestial pole in the second image, and the longer the interval between taking the first and second images is, the greater the displacement will become, causing an error in the calculated pixel coordinates of image rotation center.

More further, between step S31 and step S33 in the present embodiment, there is a step S32. In the step S32, the angle of rotation of the Earth during the interval between taking the first and second images is added to the equatorial longitude value of the equatorial coordinates of the arbitrary point in the step S31, so as to correct the delay error of the equatorial coordinates in the step S33.

More further, in the present embodiment, a continuous geometric hash method is used to match the image center point with the reference star catalog in the database (the equatorial coordinates of the center point of the reference star catalog are known), thereby calculating the equatorial coordinates of the image center point in a fast manner.

Specifically, in the step A2, calculating the equatorial coordinates of the center point of the first/second/n image through the matching algorithm includes the following steps:

As shown in FIG. 10, two stars in the image of the sky area are randomly selected and denoted as A and B, the coordinates of Star A are denoted as (0,0), the coordinates of Star B are denoted as (1,1), and a circular area with AB as the diameter is constructed. Another two stars in the circular area are selected and denoted as C and D, the coordinates of Star C and Star D are denoted as (xc, yc) and (xd, yd), respectively, and ABCD form a first four-star combination. First geometric hash codes corresponding to all first four-star combinations are then calculated. Geometric hash code refers to a four-dimensional vector (xc, yc, xd, yd), which describes the relative position of the four stars, and the geometric hash code is invariant in the case of image translation, scale transformation and image rotation. In order to prevent C and D from becoming symmetry, this symmetry is broken by letting xc<xd and xc+xd≤1.

As shown in FIG. 11, in order to prevent star points in the reference star catalog from participating in the matching, resulting in too much computation, the reference star catalog is divided into grids, and a plurality of stars with the highest brightness (preferably the first 10 stars) are screened from each grid, a second four-star combination is formed by grouping four of the plurality of screened stars, and a second geometric hash code corresponding to each second four-star combination is calculated. The method for calculating the second geometric hash code is the same as that in the step A21.

Successfully matching the first four-star combinations successfully matches the second four-star combinations when the difference between the first geometric hash code and the second geometric hash code falls within the preset second threshold. It is determined that the images are within the corresponding sky area when the number of successfully matched second four-star combinations and first four-star combinations in a grid exceeds a preset third threshold, and the equatorial coordinates corresponding to the center point of the images are obtained through the corresponding relationship between the successfully matched first four-star combinations and second four-star combinations.

In the present embodiment, the technical effects that can be achieved by the solution further include:

by calculating the horizon coordinates of the image rotation center to obtain the horizon coordinates of the polar axis (the horizon coordinates of the polar axis is equal to the horizon coordinates of the image rotation center), the main lens of the astronomical telescope can be directly used to take the images for polar axis alignment, without the need for a separate polar-axis mirror, thus reducing the cost of equipment;

the mapping relationship between the pixel coordinates of an image and the equatorial coordinate conversion can be established by analyzing the obtained coordinate files, and the pixel coordinates and the equatorial coordinates of an arbitrary point in the image can be converted to each other. When performing the polar axis alignment, the field of view of a polar-axis mirror does not have to be limited to be near the celestial pole, but the main lens of an astronomical telescope can photograph any sky area instead, and the pointing of the equatorial mount is then adjusted according to the prompt, photographing is made repeatedly and the pointing of the equatorial mount again, so that the polar axis gradually approaches to the celestial pole, facilitating the operation of users;

when calculating the pixel coordinates of the image rotation center (namely, the pixel coordinates of the polar axis), the angle of rotation of the Earth during the interval between taking the first and second images is added to the equatorial longitude value of the equatorial coordinates of the arbitrary point in the step S31, to correct the delay error of the equatorial coordinates in the step S33, and the accuracy of calculation of the pixel coordinates of the image rotation center is thus improved, which is beneficial to improving the accuracy of the polar axis alignment; and the matching algorithm is used to accelerate the acquisition of the equatorial coordinates corresponding to the image center point, which is beneficial to improve the efficiency of the polar axis alignment.

In a preferred embodiments of the present application, as shown in FIG. 16, the step 4 includes the following steps:

E1, an image rectification processing on the images of the target in the sky area is performed through the images taken by the image acquisition device in a dark field, a bias field and a flat field, separately, to obtain the rectified images of the target in the sky area;

E2, a noise reduction processing on the rectified images of the target in the sky area is performed to obtain the noise-reduced images of the target in the sky area;

E3, a multiple overlay processing on the noise-reduced images of the target in the sky area is performed to obtain the images with enhanced celestial images but weakened background images of the target in the sky area; and E4, a nonlinear stretching processing on the overlaid images of the target in the sky area is performed to obtain the images after nonlinear stretching of the pixels among the images of the target in the sky area.

In the step E1, an image of the target in the sky area is a bight field, the dark field involve an image generated by exposure of the image acquisition device under the condition that the lens is covered, and the bright field is rectified and processed through the dark field, so as to eliminate fixed thermal noise point among the images of the target in the sky area.

Further, the bias field is an image acquired by the image acquisition device in the shortest possible exposure time when the lens is covered, and the images of the target in the sky area are rectified and processed through the bias field, so as to reduce the impact of dark noise of the device itself.

Further, the flat field is an image taken by connecting the image acquisition device to a telescope and taken against uniform white light, and the images of the target in the sky area are rectified and processed through the flat field, so as to reduce the impact that the center part of the images is bright but the edge part of the same is dark due to the optical effect of the telescope.

In the embodiment of the present application, as shown in FIG. 19, the step E2 includes the following steps:

E21, a pixel point greater than a preset multiple of the sum of such four pixel points as upper, lower, left, and right is determined as a thermal noise point; and E22, the average value of the four upper, lower, left, and right pixel points is filled as the pixel value of the thermal noise point.

That is to say, in the step E2, when the value of a certain pixel point of the images of the target in the sky area is greater than the preset multiple of the sum of its four surrounding pixel points (upper, lower, left, and right), the pixel point is considered to be a thermal noise point. Therefore, when a certain pixel point is determined to be a thermal noise point, the average value of the four pixel points around the thermal noise point (upper, lower, left, and right) is filled in the position of the pixels of the thermal noise point as a new pixel value, namely, the pixel value replacing the thermal noise point. Preferably, the preset multiple is 2.5 times, or other multiples.

Figure 20:
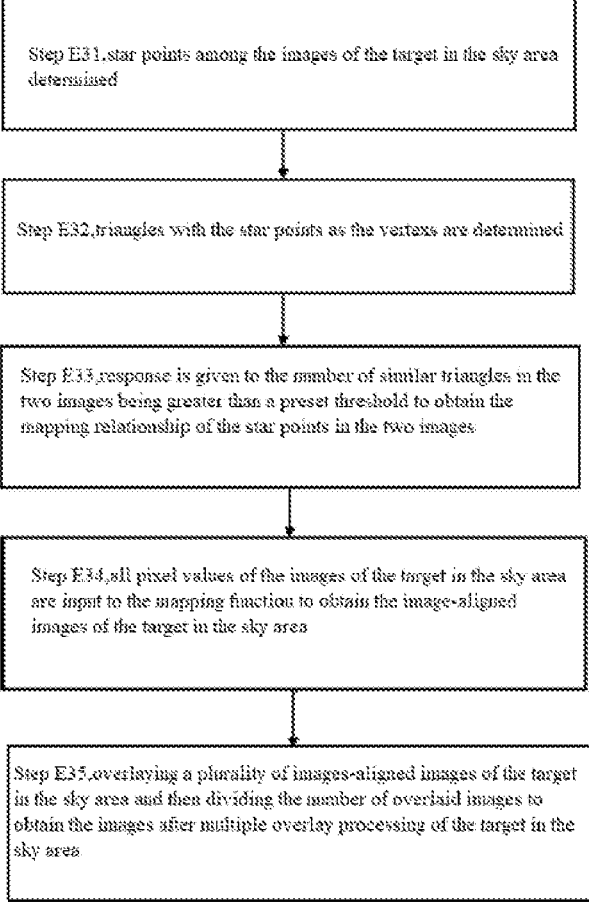
FIG. 20 shows a flowchart of steps for performing a multiple overlay processing on the noise-reduced images of a target in a sky area of the present application.

In the embodiment of the present application, as shown in FIG. 20, the step E3 includes the following steps:

E31, star points among the images of the target in the sky area determined;

E32, triangles with the star points as the vertexs are determined;

E33, response is given to the number of similar triangles in the two images being greater than a preset threshold to obtain the mapping relationship of the star points in the two images, where the mapping function is F(x, y)=a1+a2*x+a3*y+a4*x*y, whereby the parameters a1, a2, a3, a4 are obtained through the matrix method by inputting the pixel values of the 8 star points matched as similar triangles into the function;

E34, all pixel values of the images of the target in the sky area are input to the mapping function to obtain the image-aligned images of the target in the sky area; and E35, overlaying a plurality of images-aligned images of the target in the sky area and then dividing the number of overlaid images to obtain the images after multiple overlay processing of the target in the sky area.

In the step E31, star points among the images of the target in the sky area are determined by performing star point detection processing on the images of the target in the sky area. In general, stars have the following characteristics: small size, consistent brightness decay (getting darker and darker from the center of a star point to the surroundings), translation invariance, and rotation invariance. Of course, those with the above characteristics are not necessarily the stars, but may also be thermal noise, and the like. Therefore, the non-star points are excluded as many as possible through the steps E1 and E2, so as to improve the accuracy. Further, when detecting the stars, star point screening can be performed, for example, oversaturated stars, too bright stars, too dim stars, multiple stars, and stars located in the edge area among the images of the target in the sky area may be eliminated, so as to prevent these star points from being unfavorable for the alignment operation in the subsequent step E34.

In the step E32, under the condition that N star points among the images of the target in the sky area is determined in the step E1, the number of triangles that can be identified among the images of the target in the sky area is: N*(N−1)*(N−2)/6.

In the step E33, when the number of similar triangles of the target image and the reference image is greater than a certain number, it is considered that the two images are successfully matched, and the mapping relationship between the star points of the two images are then determined according to the pixel values of the corresponding star points in the two images. Preferably, the mapping function F(x, y)=a1+a2*x+a3*y+a4*x*y is established, whereby the parameters a1, a2, a3, a4 are obtained through the matrix method by inputting the pixel values of the 8 star points matched as similar triangles into the function, and the mapping function is expressed as the mapping relationship between the star points in the two images.

E34, in the step E34, the pixel values of the images of the target in the sky area are input into the mapping function, so that the pixel values of the plurality of the images of the target in the sky area are aligned. It should be understood that the image acquisition device has a preset exposure time to obtain a plurality of the images of the target in the sky area. In the step E34, the pixel values of the plurality of the images of the target in the sky area are aligned through the mapping function.

In the step E35, in the overlaid images of the target in the sky area, the images of the target celestial body are enhanced, and the background images are weakened, so as to improve the quality of images.

In the present embodiment, when a linear stretching processing is performed on the images of the target in the sky area, the stretched images are unable to highlight the details of the target celestial body and easily to overexpose the images, which is unfavorable for users to view. Specifically, assuming that the grayscale range of the original image f(x,y) is [a,b], and the grayscale range of the enhanced image g(x,y) is expected to be extended to [c,d], then the formula of liner stretching is:

$$g(x, y) = [(d - c)/(b - a)] f(x, y) + c$$

It may be seen from the formula that the images obtained by the linear stretching method feature globality but are unable to highlight the details, and the images are easily to be overexposed. For the inherently dark astronomical images, processing the astronomical images through the linear stretching method is difficult to show good results. Therefore, in the present application, in the step E4, a nonlinear stretching is used to process the images of the target in the sky area, so as to improve the quality of images.

Specifically, in the step E4, the nonlinear stretching processing on the images involves a nonlinear stretching of the pixel values in the images through a nonlinear function. The nonlinear function includes the following three points:

Shadow value (lo): the mean value of the image pixels—the variance of image pixels, where the mean value refers to the median, which is the pixel value in the middle of the sequence formed by arranging all pixel values in a descending order.

Median value (m): Median of image pixels+2.5*the variance of image pixels.

Highlight point (hi): 65535, the brightness of each pixel in the image is represented by a numerical value, while the brightness of each pixel in an astronomical image is represented by 16 bit in the computer, and the range that 16 bit can be expressed in the computer is 0-65535. Therefore, the highlight point is 65535, which is a fixed value.

The nonlinear function is MTF, which is expressed as follows:

$$Xp = (x - \text{lo})/(\text{hi} - \text{lo})$$

$$MTF(Xp) = (m - 1) * Xp/((2 * m - 1) * Xp - m)$$

The non-linear function is a smooth continuous function, with the median value being a midtone balance. Pixels below the median value but above the shadow value is greatly stretched, while those above the median value and below the highlight point is protected to avoid excessive stretching and overexposure. Therefore, in the present application, the images of the target in the sky area obtained by the nonlinear stretching method can improve the contrast of the image display and make the details of the target celestial body displayed more clearly.

In the embodiment of the present application, the method further includes a step F:

The processed images of the target in the sky area are compressed into JPG images and transmitted to a mobile terminal, or are encoded into a video stream and transmitted to a mobile terminal.

That is to say, the final images of the target in the sky area can be transmitted to a mobile terminal, and displayed on the mobile terminal in the form of JPG images or video stream. The mobile terminal includes smart mobile devices, such as mobile phones, smart watches, computers, APP devices, and the like The transmission method can be wireless transmission, such as WiFi transmission, transmission via 3G, 4G, 5G networks, Bluetooth transmission, or wired transmission. Alternatively, the images of the target in the sky area may be stored in a storage medium, such as a USB flash drive, a magnetic disk, an optical drive, and the like.

Specifically, images are compressed into JPG images and transmitted to a mobile terminal, which can transmit the deep-field images with long exposure time (generally more than 5 seconds), thus being beneficial for users to view relatively weak target celestial bodies. Or a plurality of images are encoded into a video stream for transmission to the mobile terminal, which can encode successive planetary images with short exposure time (generally less than 0.5 seconds) into a video stream, thus being convenient for users to view planets in the form of video stream.

According to another aspect of the present application, a method for processing images of the sky area is further provided, including the following steps:

an image rectification processing is performed on the images of the sky area, the images of the sky area and the images taken by the image acquisition device are rectified in a dark field, a bias field and a flat field, separately, to obtain the rectified images of the sky area;

a noise reduction processing is performed on the rectified images of the sky area to obtain the noise-reduced images of the sky area;

a multiple overlay processing is performed on the noise-reduced images of the sky area to obtain the images with enhanced celestial images but weakened background images of the sky area; and a nonlinear stretching processing is performed on the overlaid images of the sky area to obtain the images after nonlinear stretching of the pixels in the images of the sky area.

According to another aspect of the present application, an astrophotographic apparatus is further provided, including:

a main body 101;

a storage medium 102; and a processor 103, where the processor is connected to the main body, the storage medium stores program instructions, and the program instructions, when being executed by the processor, cause the processor to execute a method for acquiring images of a target in the sky area, where the method for acquiring the images of the target in the sky area includes the following steps:

step 1, an image acquisition device is driven through a controlled rotatable component to point to the position near a target in the sky area according to target right ascension coordinates and target declination coordinates corresponding to a target celestial body received, and images of the sky area are acquired through the image acquisition device;

step 2. the images of the sky area are analyzed to obtain the right ascension coordinates and the declination coordinates of the center point of images for synchronizing the right ascension coordinates and the declination coordinates to the controlled rotatable component, and determining the pointing of the image acquisition device as the positions of the right ascension coordinates and the declination coordinates;

step 3, the image acquisition device is driven by the controlled rotatable component to point to a target position of the target right ascension coordinates and the target declination coordinates corresponding to the target celestial body for the image acquisition device to acquire the images of the target in the sky area according to the target right ascension coordinates and the target declination coordinates corresponding to the target celestial body, as well as the right ascension coordinates and the declination coordinates currently pointed by the image acquisition device; and step 4. an image processing is performed on the images of the target in the sky area to obtain the processed images of the target in the sky area.

In one or more embodiments of the present application, the processor executes the method for processing the images of the target in the sky area, where the processing method includes:

an image rectification processing is performed on the images of the target in the sky area through the images taken by the image acquisition device in a dark field, a bias field and a flat field, separately, to obtain the rectified images of the target in the sky area;

a noise reduction processing is performed on the rectified images of the sky area to obtain the noise-reduced images of the sky area;

a multiple overlay processing is performed on the noise-reduced images of the sky area to obtain the images with enhanced celestial images but weakened background images of the sky area; and a nonlinear stretching processing is performed on the overlaid images of the sky area to obtain the images after nonlinear stretching of the pixels in the images of the sky area.

The main body 101 may include components of an astrophotographic apparatus such as an image acquisition device, an equatorial mount, a bracket, and the like.

The processor 103 may be a central processing unit (CPU) or other form of processing unit having data processing capability and/or instruction execution capability, and may control other components in a mobile electronic device to perform desired functions.

The storage medium 102 may include one or more computer program products, which may include various forms of computer-readable storage media, such as volatile memory and/or non-volatile memory. The volatile memory may include, such as a random access memory (RAM), and/or a cache memory, or the like. The non-volatile memory may include, such as a read only memory (ROM), a hard disk, a flash memory, and the like. One or more computer program instructions may be stored on the computer-readable storage medium, and the processor may execute the program instructions to implement the methods of the various embodiments of the present application described above and/or other desires functions.

In one example, the mobile electronic device may further include: an input device and an output device, and these components are interconnected through a bus system and/or other forms of connection mechanisms (not shown).

For example, the input device may be, such as a camera module or the like for collecting image data or video data.

The output device can output various information to the outside, including classification results and the like. The output device may include, for example, a display, a lighting device, a scanner, a camera module, a speaker, a printer, and a communication network and a remote output device to which it is connected, and the like.

Finally, it should be noted that the above embodiments are only used to illustrate the technical solutions of the present application, but not to limit them; although the present application has been described in detail with reference to the foregoing embodiments, those ordinarily skilled in the art should understand that: the technical solutions described in the foregoing embodiments can still be modified, or some or all of the technical features thereof can be equivalently replaced; and these modifications or replacements do not make the essence of the corresponding technical solutions deviate from the spirit and scope of the technical solutions of the embodiments of the present application.

What is claimed is:

1. A method for acquiring an image of a target in a sky area, comprising:

step 1, driving an image acquisition device through a controlled rotatable component to point to a position near the target in the sky area, and acquiring an image of the sky area through the image acquisition device according to a target right ascension coordinate and a target declination coordinate corresponding to a target celestial body received;

step 2, analyzing the image of the sky area to obtain a right ascension coordinate and a declination coordinate of a center point of the image of the sky area for synchronizing the right ascension coordinate and declination coordinate to the controlled rotatable component, and determining that the image acquisition device is directed toward a position at which the right ascension coordinate and the declination coordinate are located;

step 3, driving the image acquisition device by the controlled rotatable component to point to a target position of the target right ascension coordinate and the target declination coordinate corresponding to the target celestial body for the image acquisition device to acquire the image of the target in the sky area according to the target right ascension coordinate and the target declination coordinate corresponding to the target celestial body, as well as the right ascension coordinate and the declination coordinate currently pointed by the image acquisition device; and step 4, performing an image processing on the image of the target in the sky area to obtain a processed image of the target in the sky area;

wherein, the controlled rotatable component is an equatorial mount, and step 1 comprises following steps:

A, performing a polar axis alignment to the equatorial mount of an astrophotographic apparatus to enable a right ascension axis of the equatorial mount to be parallel to the axis of rotation of the Earth;

step A comprises the following steps:

S1, taking a first image through the image acquisition device, analyzing the first image to obtain a first coordinate file, and establishing a mapping relationship between a pixel coordinate of the first image and an equatorial coordinate through the first coordinate file;

S2, acquiring a second image by rotating the image acquisition device to a certain angle around a polar axis, analyzing the second image to obtain a second coordinate file, and establishing a mapping relationship between a pixel coordinate of the second image and the equatorial coordinate through the second coordinate file;

S3, calculating a pixel coordinate of an image rotation center according to the first coordinate file and the second coordinate file;

S4, converting the pixel coordinate of the image rotation center into an equatorial coordinate of the image rotation center;

S5, converting the equatorial coordinate of the image rotation center into a horizon coordinate of the image rotation center; and S6, calculating a difference between the horizontal coordinate of the image rotation center and a horizontal coordinate of a celestial pole, and determining whether the difference is lower than a preset first threshold; if the difference is lower than the preset first threshold, terminating the polar axis alignment; if the difference is greater than the preset first threshold, adjusting a pointing direction of the equatorial mount according to the difference, and acquiring an $n^{th}$ image through the image acquisition device, calculating the difference between the horizontal coordinate of the image rotation center and the horizontal coordinate of the celestial pole, and determining whether the difference is lower than the preset first threshold.

2. The method according to claim 1, wherein after step A, the step 1 further comprises the following steps:

B, photographing the sky area and acquiring the image of the sky area through the image acquisition device installed on the equatorial mount after the equatorial mount rotates for a certain angle;

wherein the step 2 comprises the following steps:

C, matching stars in the image of the sky area with stars in a reference star catalog through a matching algorithm to obtain the right ascension coordinate and the declination coordinate of the center point of the image of the sky area for synchronizing the right ascension coordinate and the declination coordinate to the equatorial mount, and determining that an orientation of the image acquisition device in a celestial coordinate system are the right ascension coordinate and the declination coordinate.

3. The method according to claim 2, wherein the step C comprises the following steps:

step C1, randomly selecting two stars in the image of the sky area, and then constructing a circular area by taking the connecting line between the two selected stars as a diameter of the circular area, selecting another two stars in the circular area to form a first four-star combination, and calculating a first geometric hash code corresponding to each first four-star combination;

step C2, dividing the reference star catalog into grids, screening a plurality of stars with the highest brightness from each grid, forming a second four-star combination by grouping four screened stars, and calculating a second geometric hash code corresponding to each second four-star combination; and step C3, successfully matching the first four-star combination and the second four-star combination when a difference between the first geometric hash code and the second geometric hash code falls within a preset second threshold, determining that the image are within a corresponding sky area when the number of successfully matched second four-star combinations and first four-star combinations in a grid exceeds a preset third threshold, and obtaining the right ascension coordinate and the declination coordinate corresponding to the center point of the image of the sky area through a corresponding relationship between the successfully matched first four-star combination and second four-star combination.

4. The method according to claim 1, wherein the step 4 comprises the following steps:

E1, performing an image rectification processing on the image of the target in the sky area through images taken by the image acquisition device in a dark field, a bias field and a flat field, separately, to obtain a rectified image of the target in the sky area;

E2, performing a noise reduction processing on the rectified image of the target in the sky area to obtain a noise-reduced image of the target in the sky area;

E3, performing a multi-frame stacking processing on the noise-reduced image of the target in the sky area to obtain the image of the target in the sky area with enhanced celestial targets but a weakened background; and E4, performing a nonlinear stretching processing on the image of the target in the sky area after the multi-frame stacking processing to obtain the image of the target in the sky area in which pixels are nonlinearly stretched.

5. The method according to claim 4, wherein the step E2 comprises the following steps:

E21, determining a pixel point greater than a preset multiple of a sum of four pixel points as upper, lower, left, and right as a thermal noise point; and E22, filling an average value of the four upper, lower, left, and right pixel points as a pixel value of the thermal noise point.

6. The method according to claim 4, wherein the step E3 comprises the following steps:

E31, determining star points among the image of the target in the sky area;

E32, determining a triangle with the star points as vertices;

E33, responding to the number of similar triangles in two images being greater than a preset threshold to obtain a mapping relationship of the star points in the two images, wherein a mapping function is $F(x, y)=a1+a2*x+a3*y+a4*x*y$, whereby the parameters a1, a2, a3, a4 are obtained through a matrix method by inputting the pixel values of 8 star points matched as similar triangles into the mapping function;

E34, inputting all pixel values of the image of the target in the sky area to the mapping function to obtain an aligned image of the target in the sky area; and E35, performing stacking of multiple aligned images of the target in the sky area and then dividing by the number of stacked images to obtain the image of the target in the sky area after the multi-frame stacking processing.

7. A method for processing an image of a sky area, comprising the following steps:

performing an image rectification processing on the image of the sky area, rectifying the image of the sky area and images taken by an image acquisition device in a dark field, a bias field and a flat field, separately, to obtain a rectified image of the sky area;

performing a noise reduction processing on the rectified image of the sky area to obtain a noise-reduced image of the sky area;

performing a multi-frame stacking processing on the noise-reduced image of the sky area to obtain an image of the sky area with enhanced celestial targets but a weakened background; and performing a nonlinear stretching processing on the image of the sky area after the multi-frame stacking processing to obtain an image of the sky area in which pixels are nonlinearly stretched.

8. An astrophotographic apparatus, comprising:

a main body;

a storage medium; and a processor, wherein the processor is connected to the main body, wherein the storage medium stores program instructions, and the program instructions, when being executed by the processor, cause the processor to execute the method according to claim 1.

* * * * *